(12) United States Patent
Tetrault

(10) Patent No.: US 9,540,777 B1
(45) Date of Patent: *Jan. 10, 2017

(54) METHOD FOR COOLING OF SYNTHETIC TURF

(71) Applicant: Christopher Tetrault, Amelia, OH (US)

(72) Inventor: Christopher Tetrault, Amelia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,770

(22) Filed: Jun. 12, 2015

Related U.S. Application Data

(63) Continuation of application No. 13/870,825, filed on Apr. 25, 2013.

(60) Provisional application No. 61/638,136, filed on Apr. 25, 2012.

(51) Int. Cl.
| | | |
|---|---|---|
| *E01C 13/00* | (2006.01) | |
| *E01C 13/08* | (2006.01) | |
| *E01C 5/20* | (2006.01) | |
| *B01J 20/32* | (2006.01) | |

(52) U.S. Cl.
CPC ............ *E01C 13/08* (2013.01); *B01J 20/3231* (2013.01); *E01C 5/20* (2013.01); *Y10T 428/2982* (2015.01); *Y10T 428/2991* (2015.01)

(58) Field of Classification Search
CPC .............. E01C 13/08; E01C 5/20; B05D 7/00; B01J 20/26; B01J 20/3231; Y10T 428/23921; Y10T 428/2982; Y10T 428/2991

See application file for complete search history.

(56) References Cited

U.S. PATENT DOCUMENTS

| | | | | |
|---|---|---|---|---|
| 8,795,834 B2 * | 8/2014 | Tetrault et al. | ......... | E01C 13/08 428/17 |
| 2012/0230777 A1 * | 9/2012 | Ayers et al. | ............ | E02D 17/20 405/302.7 |
| 2014/0322459 A1 * | 10/2014 | Tetrault et al. | ......... | E01C 13/08 428/17 |

* cited by examiner

*Primary Examiner* — Nathan M Nutter
(74) *Attorney, Agent, or Firm* — Jenei LLC

(57) ABSTRACT

The present invention provides for synthetic turf infill materials and methods of making such materials wherein the surfaces of the materials have been modified with hydrophilic properties. The various exemplary embodiments of the present invention include a method to modify the surface of synthetic turf infill through coating, crosslinking or other methods. The surface of the infill is modified to become substantially hydrophilic with low contact angles. The present invention also provides a process for producing surfaces with hydrophilic properties.

16 Claims, 1 Drawing Sheet

METHOD FOR COOLING OF SYNTHETIC TURF

CROSS REFERENCE TO RELATED APPLICATIONS

This Application for Patent claims priority under 35 U.S.C. §120 and is a continuation-in-part of patent application Ser. No. 13/870,825, entitled "Method For Cooling Of Synthetic Turf" filed Apr. 23, 2013, which claims priority under 35 U.S.C. 119(e) of U.S. Provisional Application Ser. No. 61/638,136, filed Apr. 25, 2012, the entire contents of these are hereby incorporated by reference in their entirety for any purpose.

BACKGROUND OF THE INVENTION

1. Field of the Invention

The present invention relates to a method and of cooling synthetic turf systems by modifying the surface tension or contact angle of the surface of the infill materials in order to enable wetting out of those materials as well as enabling capillary action within the infill matrix. The standard synthetic turf infill materials are extremely hydrophobic with high contact angle characteristics. The objective with this invention is to provide a low cost non-mechanical method to cool synthetic turf. This in turn will both improve the safety to users of synthetic as well as enhance the performance characteristics of the turf system. This invention does not increase the absorption of the infill materials but eliminated the hydrophobic aspect of the infill particles surface, which enables the interstitial and pore spaces to hold and move moisture through surface tension and capillary forces.

2. Description of the Related Art

It has long been known that the surface synthetic turf reaches extremely high temperatures sometime exceeding safety thresholds. There have been attempts to cool the synthetic turf using mechanical means, however none have been found to provide a cost effective solution. This invention harnesses the power of evaporative cooling by turning the infill materials and corresponding interstitial spaces into a network of tiny reservoirs that hold the water until enough heat energy has been applied causing the water to evaporate and the surface of the turf to cool dramatically.

The physics at work in this invention takes advantage of the ten of thousands of micro water containment spaces that created by the enclosure of the surface of the infill particles that surround these spaces. The surfaces of the infill particles also hold thin films of water through surface tension adding to the available cooling capacity. The total surface area and inter spaces of the infill in a typical athletic field is staggering. Therefore a large cooling capacity exists when this invention is applied.

Industries other than the Synthetic Turf Industries have relied on surface tension/energy modification to achieve various improvements in their products. In most cases this modification of hydrophobic surfaces has been deployed in order to increase lubriciousness and reduce friction. For example the medical industry has long used methods to modify surface tension of catheters and other tools in order to reduce trauma as the tool is being used on the patient. The metal working industry has also used surface tension modification coating to reduce heat and friction between tool and subject. Hydrophilic coatings have also found there way into the optometry business to coat lenses and tools, again in order to reduce trauma to the patient. Yet another examples of effective use of hydrophilic surface modification is in the building trades applied to create self-cleaning surfaces.

Thus, what is needed is an environmentally-friendly, cost-effective, non-toxic, means of sustaining evaporative cooling of synthetic turf surfaces during athletic activity and anytime there is strong radiant solar heat present in order to provide safety to players and reduce the impact the urban heat island.

SUMMARY OF THE INVENTION

The various exemplary embodiments of the present invention include a method to modify the surface of synthetic turf infill through coating, crosslinking or other methods. The surface of the infill is modified to become substantially hydrophilic with low contact angles. The coating/crosslinking can be accomplished with coating equipment such as the Rollo Mixer manufactured by Continental Products Corp, 50863 Elevator St., Osseo, Wis. 54758 or any other equipment that can evenly coat the infill particles with a coating that will render the surface hydrophilic. The equipment used in the preparation of painted mulch made from rubber tires is another example such as such as equipment sold by Colorbiotics 1725 Dayton Avenue, P.O. Box 647 Ames, Iowa 50010

The coating material can be one or more substance that will substantially modify the surface of the synthetic turf infill particle. Examples are triethanolamine, propylene glycol, titanium dioxide and a variety of different flouro surfactants. Preferred surfactants are those that are biocompatible for use in aquatic weed control or in situations where some of the surfactant is likely to be introduce into ground water such as materials with trade names like Carbowet® 13-40, Cide Kick (d,l-limonene), Cygnet Plus (d,-limonene and related isomers), EnviroGem, Klucel, Plex Mate, Pluronics, SilEnergy (an organosilicone surfactant, potyalkyleneoxide modified polydimethyisloloxane and non-ionic surfactants), Suretech 827 and 830, Triton.

The modification of surfaces with the materials described may be carried out, for example, by the methods known from the prior art, such as dip, spray or spin coating, flow coating, misting, brush application, rolling, printing, screen printing, stamping and—given a suitable consistency of the formulas of the invention that are used for surface modification—by powder coating methods as well.

The present invention therefore provides surfaces with hydrophilic properties, wherein the surfaces comprise particles with hydrophilic properties. The present invention also provides a process for producing surfaces with hydrophilic properties. The methods provide that activating the surface of the infill add little bulk if any to infill materials, providing more space for water film on the surfaces and pores of the materials.

The process of the invention and the surfaces of the invention are described by way of example below without any intention that the invention be restricted to these.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

Figure 1:
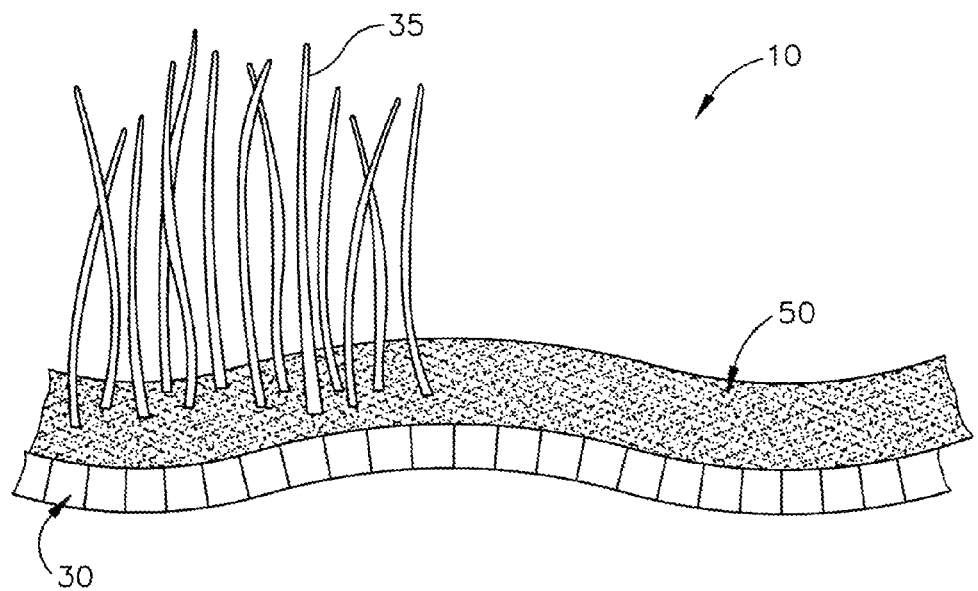
FIG. 1 is an illustrated representation of an exemplary embodiment of the present invention.

In reference to the drawings, similar reference characters denote similar elements throughout all the drawings. The following is a list of the reference characters and associated element:
10 synthetic turf system
30 backing layer
35 plurality of grass-like filaments
50 infill
60 a first (bottom) infill layer
70 a second (top) infill layer
80 one or more third (middle) infill layers

DETAILED DESCRIPTION

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated as incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

DEFINITIONS

As used in the present specification, the following words and phrases are generally intended to have the meanings as set forth below, except to the extent that the context in which they are used indicates otherwise.

"Performance-enhancing active" or "performance-enhancing additive" as used herein, refers to any additive which is desirable to add to the infill particles including an antimicrobial, an odor reducing material, a binder, a fragrance, a color altering agent, a dust reducing agent, a nonstick release agent, a cyclodextrin, zeolite, activated carbon, a pH altering agent, a salt forming material, a ricinoleate, silica gel, UV stabilizers or protectants, crystalline silica, activated alumina, an anti-clumping agent, and mixtures thereof. Performance-enhancing actives that inhibit the formation of odor include a water-soluble metal salt such as silver, copper, zinc, iron, and aluminum salts and mixtures thereof.

In one embodiment, the performance-enhancing additive is sprayed onto the particles. In another embodiment, the performance-enhancing additives are dry-blended with the particles. In another embodiment the performance enhancing additive is blended with an elastomeric material than ground into particles.

The term "rubber" as used in relation to either rubber particles or rubber coated particles means any resilient elastomeric material, including natural and artificial rubbers, elastomers and polymers such as thermoplastic polymers and elastomers and equivalent materials.

Examples of elastomers include acryl rubber, butyl rubber, carboxylated acrylonitrile butadiene rubber (XNBR), carboxylated hydrogenated acrylonitrile butadiene rubber (XHNBR), EPDM/acrylonitrile graft copolymer, EPDM/styrene copolymer, epoxylated natural rubber, ethylene propylene (EPR), ethylene-propylene copolymers, ethylene-propylene-diene monomer (EPDM) rubber, ethylene-propylene-diene terpolymers, ethylenically unsaturated nitrile-conjugated diene-based high saturation copolymer rubber, fluoroelastomers (FKM), halogenated butyl rubber, hereinafter called EPDM, hereinafter called EPM, hydrin rubber, hydrogenated acrylonitrile butadiene rubber (HNBR), hydrogenated carboxylated acrylonitrile butadiene rubber (HXNBR), maleated BIMS copolymer, maleated ethylene-acrylic acid copolymer, maleated ethylene-butene rubber, maleated ethylene-decene rubber, maleated ethylene-ethyl acrylate copolymer, maleated ethylene-hexene rubber, maleated ethylene-methyl acrylate copolymer, maleated ethylene-octene rubber, maleated ethylene-propylene copolymer rubber, maleated ethylene-vinyl acetate copolymer, maleated halogenated isobutylene-isoprene copolymer, maleated isobutylene-isoprene copolymer, maleated isobutylene-paramethylstyrene copolymer, maleated star branched butyl (SBB) copolymer, maleic acid modified EPDM/acrylonitrile graft copolymer, maleic acid modified EPDM/styrene copolymer, maleic anhydride grafted acrylonitrile-butadiene-styrene rubber, maleic anhydride grafted ethylene-propylene-diene rubber, maleic anhydride grafted styrene-ethylene/butadiene-styrene rubber, natural rubbers, nitrile acrylonitrile butadiene rubber (NBR), nitrile butadiene rubber, nitrile rubber, perfluoroelastomers (FEKM), polyetheresters, polyethylene or polypropylene homo- or copolymers and polyisobutylene, polyisoprene, polymers comprising a thermoplastic and an elastomer, polyurethanes, reactive phenoxy thermoplastic resins, styrene-butadiene rubber (SBR), styrene/maleic acid copolymer, tetrafluoroethylene and propylene monomer (FEPM) elastomers as well as copolymers and mixtures thereof.

Examples of thermoplastic elastomers (TPE) include:

Styrenic Block Copolymers (TPE-S). SBS is based on two-phase block copolymers with hard and soft segments. The styrene end blocks provide the thermoplastic properties and the Butadiene mid-blocks provide the elastomeric properties. SBS when hydrogenated becomes SEBS, as the elimination of the C=C bonds in the butadiene component generated ethylene and butylenes mid-block, hence the SEBS acronym. Much improved heat resistance, mechanical properties and chemical resistance characterize SEBS. Monprene® Tekron® and Elexar® products from Teknor Apex are good examples of hydrogenated styrenic block copolymers.

Thermoplastic Polyolefins (TPE-O or TPO). These materials are blends of polypropylene (PP) and un-cross-linked EPDM rubber, in some cases a low degree of cross-linking is present to boost heat resistance and compression set properties.

Thermoplastic vulcanisates (TPE-V or TPV). These materials are the next step up in performance from TPE-O. These are compounds of PP and EPDM rubber, however they have been dynamically vulcanized during the compounding step. The Uniprene® series from Teknor Apex is a very good example of TPE-V. Uniprene XL increases the upper temperature limit towards 140° C. with big improvements in long terms compression set resistance versus standard TPE-V materials. There are a number of new TPE-Vs being introduced, termed "Super TPVs" which are based on engineering plastics blended with high performance elastomers, which can offer greatly improved heat and chemical resistance.

Thermoplastic polyurethanes (TPE-U or TPU). These materials can be based on polyester or polyether urethane types and are used in applications where a product requires excellent tear strength, abrasion resistance, and flex fatigue resistance.

Thermoplastic copolyesters (TPE-E or COPE or TEEE) are used where increased chemical resistance and heat resistance up to 140° C. are needed.

Melt processable rubber (MPR) is designed for more demanding applications requiring chemical resistance, particularly resistance to oil and grease, where MPR replaces cross-linked nitrile rubber. It also possesses properties similar to those of vulcanized rubber in noise-dampening applications and has similar stress relaxation properties.

Thermoplastic polyether block amides (TPE-A). These products offer the good heat resistance, have good chemical resistance and bonding to polyamide engineering plastics.

In one embodiment, the synthetic rubber may be a butadiene rubber comprising from about 100% to about 60% by weight of the composition. In one embodiment, the butadiene rubber is polybutadiene or styrene-butadiene rubber that preferably comprises from about 90% to about 80% by weight of the composition. In one embodiment, however, the butadiene rubber is a styrene-butadiene that comprises about 85-90% by weight of the composition. The synthetic rubber is preferably granulized with the granules having a diameter that allows for maximum sized air voids while giving the desired degree of softness-hardness and strength. In one embodiment, the granule size ranges from about 1 millimeter to about 10 millimeters in diameter. In one embodiment, the source for the granulized synthetic rubber is recycled tires that are commercially available. In one embodiment, the granulized rubber is preferably comprised of granulized reinforced polycord tires with no steel present and with the polycord being comprised of nylon or polyester.

As used herein, the term "surface-treatment agent" or "surface-modifying agent" refers to chemical agents that have the ability to modify, alter or react with the surface of a substrate by forming chemical bonds on the surface of the substrate. Specific non-limiting classes of surface treatment agents include surface-active agents, which include surfactants, detergents, wetting agents and emulsifiers. Surface-active agents may be nonionic, anionic, cationic, amphoterics, hydrophobic or hydrophilic.

"Substrate" as used herein, refers to any surface upon which it is desirable to deposit a coating comprising a polymer, a mix of polymers or water-adsorbing materials. In the present invention, the substrate is generally made up of fine granules of stone, gravel, sand, asphalt, cement, ceramic beads, soil, clay, diatomaceous earth, perlite, silica, organic minerals, rubber or combinations thereof.

The term "% by weight" or "% wt" when used herein and referring to components of the composition, is to be interpreted as based on the weight of the composition, unless otherwise specified herein.

These terms may be defined with additional language in the remaining portions of the specification.

The present invention relates to a method and of cooling synthetic turf systems by modifying the surface tension/contact angle of the surface of the infill materials in order to enable wetting out of those materials as well as enabling capillary action within the infill matrix. The standard synthetic turf infill materials are extremely hydrophobic with high contact angle characteristics.

The objective with this invention is to provide a low cost non-mechanical method to cool synthetic turf. This in turn will both improve the safety to users of synthetic as well as enhance the performance characteristics of the turf system. This invention does not increase the absorption of the infill materials but eliminates the hydrophobic aspect of the infill particles surface, which enables the interstitial or pore spaces to hold and move moisture through surface tension and capillary forces thereby increasing adsorption.

The various exemplary embodiments of the present invention include a method of coating various infill particles such as sand, rubber ETC with a surface-modifying agent. There are many types of materials that can be used as long as they meet performance, safety and cost objective.

Dipping, spraying, and/or dot spraying an aqueous solution of the surface-modifying agent can coat the infill. Upon coating the surface of the infill particle shall be evenly coated The coated infill can be dried in line immediately after the coating process or can be done at any time after it is coated. It can even be dried by ambient conditions after installation.

When the athletic field receives rainfall or irrigation the surface should readily expect the moisture and it will quickly wet out the infill substrate filling the interstitial space as well as depositing a thin film of water on the infill. Quite unlike an untreated field, which due to the hydrophobic characteristics of the infill causes puddles of water on the surface, moving the top layer of infill around in an undesirable fashion and the water quickly drains through the infill matrix and is not maintained to any great degree in the infill. The coating material can be added in situ from time to time, if necessary.

Surface temperature levels of the improved synthetic turf invention described in this document can be expected to be 25° to 40° cooler than standard synthetic turf for a sustained period of time adding considerably to the value of the field from a safety and performance perspective While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

An unexpected benefit of the invention is that it greatly improves the management of storm water by increasing the storage capacity of the turf infill aiding in the effective retention of storm water during a significant rain event.

The hydrophilic surfaces may be produced by a variety of processes. In one embodiment, the process used is the treatment of the surface of polymers with plasma. In one embodiment, the plasma is a microwave plasma or of low-pressure plasma. As used herein, the term "plasma treatment" comprises conventional methods for plasma-treating materials suitable for use with the present invention.

In one embodiment, the hydrophilic surfaces are created from plasma treatments wherein the plasmas are created using one or more of oxygen plasmas, $CO_2$ plasmas, NO plasmas, and $NO_2$ plasmas. If oxygen is used, the polymer surfaces are modified so as to form functional groups, such as hydroxy, carbonyl, carboxy, and peroxide groups. The use of nitrogen and ammonia promote the formation of amine functions and imine functions. These polar, hydrophilic groups drastically alter chemical properties and improve the wettability of these surfaces. In one embodiment, the hydrophilic surfaces have contact angles of a few degrees.

In one embodiment, the present invention provides for materials and methods for coating various infill particles with a surface-modifying agent wherein the agent is a surfactant. In one embodiment, the surfactant can be any surfactant suitable for use agriculture, coating, painting, medical applications and cosmetics. In one embodiment, the surfactants can be anionic, cationic, zwitterionic or non-ionic. Mixtures of surfactants are also within the scope of the invention, as are combinations of surfactant and other additives In accordance with any of the above embodiments, the invention further comprises a surface modification. In certain embodiments, the surface modification alters a property selected from the group consisting of surface charge, surface charge density, surface hydrophobicity, and surface charge and hydrophobicity combined.

In one embodiment, the agent composition comprises from about 0.01 to about 5% (w/w) of a surfactant. In one embodiment, the agent composition comprises from about 0.01 to about 1% (w/w). In one embodiment, the agent composition comprises from about 0.03 to about 0.5% (w/w) of a surfactant. The surfactant can be any surfactant that assists in modifying the surface tension/contact angle of the surface of the infill materials in order to enable wetting out of those materials as well as enabling capillary action within the infill matrix. In one embodiment, the composition used in the present invention does not increase the absorption of the infill materials but eliminates the hydrophobic aspect of the infill particles surface, which enables the interstitial/pore spaces to hold and move moisture through surface tension and capillary forces.

In one embodiment, the surfactant is a hydrophilic surfactant. In one embodiment, the surfactant compound has an HLB value greater than about 10, as well as anionic, cationic, or zwitterionic compounds for which the HLB scale is not generally applicable.

An empirical parameter commonly used to characterize the relative hydrophilicity and hydrophobicity of surfactants is the hydrophilic-lipophilic balance ("HLB" value). Surfactants with lower HLB values are more hydrophobic, and have greater solubility in oils, while surfactants with higher HLB values are more hydrophilic, and have greater solubility in aqueous solutions. Using HLB values as a rough guide, hydrophilic surfactants are generally considered to be those compounds having an HLB value greater than about 10, as well as anionic, cationic, or zwitterionic compounds for which the HLB scale is not generally applicable. Similarly, hydrophobic surfactants are compounds having an HLB value less than about 10. In certain embodiments of the present invention, a higher HLB value is preferred, since increased hydrophilicity may facilitate aqueous materials from entering the micropores of the surface of the infill material.

In one embodiment, the HLB of the surfactant additive is higher than 5. In one embodiment, the HLB of the surfactant additive is higher than 9. In another embodiment, the additive HLB is higher than 14. The HLB values of surfactant additives in certain embodiments are in the range of 0.0-40.

It should be understood that the HLB value of a surfactant is merely a rough guide generally used to enable formulation of industrial, pharmaceutical and cosmetic emulsions, for example. For many important surfactants, including several polyethoxylated surfactants, it has been reported that HLB values can differ by as much as about 8 HLB units, depending upon the empirical method chosen to determine the HLB value (Schott, J. Pharm. Sciences, 79(1), 87-88 (1990)). Keeping these inherent difficulties in mind, and using HLB values as a guide, surfactants may be identified that have suitable hydrophilicity or hydrophobicity for use in embodiments of the present invention, as described herein.

PEG-Fatty Acids and PEG-Fatty Acid Mono and Diesters

Although polyethylene glycol (PEG) itself does not function as a surfactant, a variety of PEG-fatty acid esters have useful surfactant properties. Among the PEG-fatty acid monoesters, esters of lauric acid, oleic acid, and stearic acid, myristoleic acid, palmitoleic acid, linoleic acid, linolenic acid, eicosapentaenoic acid, erucic acid, ricinoleic acid, and docosahexaenoic acid are most useful in embodiments of the present invention. In one embodiment, the hydrophilic surfactants include PEG-8 laurate, PEG-8 oleate, PEG-8 stearate, PEG-9 oleate, PEG-10 laurate, PEG-10 oleate, PEG-12 laurate, PEG-12 oleate, PEG-15 oleate, PEG-20 laurate and PEG-20 oleate. The HLB values are in the range of 4-20.

Polyethylene glycol fatty acid diesters are also suitable for use as surfactants in the compositions of embodiments of the present invention. In one embodiment, the hydrophilic surfactants include PEG-20 dilaurate, PEG-20 dioleate, PEG-20 distearate, PEG-32 dilaurate and PEG-32 dioleate. The HLB values are in the range of 5-15.

In one embodiment, mixtures of surfactants are also useful in embodiments of the present invention, including mixtures of two or more commercial surfactants as well as mixtures of surfactants with another additive or additives. Several PEG-fatty acid esters are marketed commercially as mixtures or mono- and diesters.

Polyethylene Glycol Glycerol Fatty Acid Esters

In one embodiment, the hydrophilic surfactants are PEG-20 glyceryl laurate, PEG-30 glyceryl laurate, PEG-40 glyceryl laurate, PEG-20 glyceryl oleate, and PEG-30 glyceryl oleate.

Alcohol-Oil Transesterification Products

A large number of surfactants of different degrees of hydrophobicity or hydrophilicity can be prepared by reaction of alcohols or polyalcohol with a variety of natural and/or hydrogenated oils. Most commonly, the oils used are castor oil or hydrogenated castor oil, or an edible vegetable oil such as corn oil, olive oil, peanut oil, palm kernel oil, apricot kernel oil, or almond oil. Preferred alcohols include glycerol, propylene glycol, ethylene glycol, polyethylene glycol, sorbitol, and pentaerythritol. Among these alcohol-oil transesterified surfactants, preferred hydrophilic surfactants are PEG-35 castor oil, polyethylene glycol-glycerol ricinoleate (Incrocas-35, and Cremophor EL&ELP), PEG- 40 hydrogenated castor oil (Cremophor RH 40), PEG-15 hydrogenated castor oil (Solutol HS 15), PEG-25 trioleate (TAGAT® TO), PEG-60 corn glycerides (Crovol M70), PEG-60 almond oil (Crovol A70), PEG-40 palm kernel oil (Crovol PK70), PEG-50 castor oil (Emalex C-50), PEG-50 hydrogenated castor oil (Emalex HC-50), PEG-8 caprylic/capric glycerides (Labrasol), and PEG-6 caprylic/capric glycerides (Softigen 767). Preferred hydrophobic surfactants in this class include PEG-5 hydrogenated castor oil, PEG-7 hydrogenated castor oil, PEG-9 hydrogenated castor oil, PEG-6 corn oil (Labrafil® M 2125 CS), PEG-6 almond oil (Labrafil® M 1966 CS), PEG-6 apricot kernel oil (Labrafil® M 1944 CS), PEG-6 olive oil (Labrafil® M 1980 CS), PEG-6 peanut oil (Labrafil® M 1969 CS), PEG-6 hydrogenated palm kernel oil (Labrafil® M 2130 BS), PEG-6 palm kernel oil (Labrafil® M 2130 CS), PEG-6 triolein (Labrafil®b M 2735 CS), PEG-8 corn oil (Labrafil® WL 2609 BS), PEG-20 corn glycerides (Crovol M40), and PEG-20 almond glycerides (Crovol A40).

Polyalyceryl Fatty Acids

Polyglycerol esters of fatty acids are also suitable surfactants for use in embodiments of the present invention. Among the polyglyceryl fatty acid esters, preferred hydrophobic surfactants include polyglyceryl oleate (Plurol Oleique), polyglyceryl-2 dioleate (Nikko) DGDO), polyglyceryl-10 trioleate, polyglyceryl stearate, polyglyceryl laurate, polyglyceryl myristate, polyglyceryl palmitate, and polyglyceryl linoleate. Preferred hydrophilic surfactants include polyglyceryl-10 laurate (Nikkol Decaglyn 1-L), polyglyceryl-10 oleate (Nikkol Decaglyn 1-O), and polyglyceryl-10 mono, dioleate (Caprol® PEG 860), polyglyceryl-10 stearate, polyglyceryl-10 laurate, polyglyceryl-10 myristate, polyglyceryl-10 palmitate, polyglyceryl-10 linoleate, polyglyceryl-6 stearate, polyglyceryl-6 laurate, polyglyceryl-6 myristate, polyglyceryl-6 palmitate, and polyglyceryl-6 linoleate. Polyglyceryl polyricinoleates (Polymuls) are also preferred surfactants.

Propylene Glycol Fatty Acid Esters

In one embodiment, esters of propylene glycol and fatty acids are suitable surfactants for use in embodiments of the present invention. In this surfactant class, preferred hydrophobic surfactants include propylene glycol monolaurate (Lauroglycol FCC), propylene glycol ricinoleate (Propymuls), propylene glycol monooleate (Myverol P—O6), propylene glycol dicaprylate/dicaprate (Captex® 200), and propylene glycol dioctanoate (Captex® 800).

Sterol and Sterol Derivatives

In one embodiment, sterols and derivatives of sterols are suitable surfactants for use in embodiments of the present invention. Preferred derivatives include the polyethylene glycol derivatives. In one embodiment, the surfactant in this class is PEG-24 cholesterol ether (Solulan C-24).

Polyethylene Glycol Sorbitan Fatty Acid Esters

In one embodiment, a variety of PEG-sorbitan fatty acid esters are available and are suitable for use as surfactants in embodiments of the present invention. In one embodiment, the PEG-sorbitan fatty acid esters, preferred surfactants include PEG-20 sorbitan monolaurate (Tween-20), PEG-4 sorbitan monolaurate (Tween-21), PEG-20 sorbitan monopalmitate (Tween-40), PEG-20 sorbitan monostearate (Tween-60), PEG-4 sorbitan monostearate (Tween-61), PEG-20 sorbitan monooleate (Tween-80), PEG-4 sorbitan monooleate (Tween-81), PEG-20 sorbitan trioleate (Tween-85). Laurate esters are preferred because they have a short lipid chain compared with oleate esters, increasing drug absorption.

Polyethylene Glycol Alkyl Ethers

Ethers of polyethylene glycol and alkyl alcohols are suitable surfactants for use in embodiments of the present invention. Preferred ethers include Lanethes (Laneth-5, Laneth-10, Laneth-15, Laneth-20, Laneth-25, and Laneth-40), laurethes (Laureth-5, laureth-10, Laureth-15, laureth-20, Laureth-25, and laureth-40), Olethes (Oleth-2, Oleth-5, Oleth-10, Oleth-12, Oleth-16, Oleth-20, and Oleth-25), Stearethes (Steareth-2, Steareth-7, Steareth-8, Steareth-10, Steareth-16, Steareth-20, Steareth-25, and Steareth-80), Cetethes (Ceteth-5, Ceteth-10, Ceteth-15, Ceteth-20, Ceteth-25, Ceteth-30, and Ceteth-40), PEG-3 oleyl ether (Volpo 3) and PEG-4 lauryl ether (Brij 30).

Sugar Derivatives

Sugar derivatives are suitable surfactants for use in embodiments of the present invention. Preferred surfactants in this class include sucrose monopalmitate, sucrose monolaurate, decanoyl-N-methylglucamide, n-decyl-.beta.-D-glucopyranoside, n-decyl-.beta.-D-maltopyranoside, n-dodecyl-.beta.-D-glucopyranoside, n-dodecyl-.beta.-D-maltoside, heptanoyl-N-methylglucamide, n-heptyl-.beta.-D-glucopyranoside, n-heptyl-.beta.-D-thioglucoside, n-hexyl-.beta.-D-glucopyranoside, nonanoyl-N-methylglucamide, n-noyl-.beta.-D-glucopyranoside, octanoyl-N-methylglucamide, n-octyl-.beta.-D-glucopyranoside, and octyl-.beta.-D-thioglucopyranoside.

Polyethylene Glycol Alkyl Phenols

In one embodiment, the PEG-alkyl phenol surfactants, such as PEG-10-100 nonyl phenol and PEG-15-100 octyl phenol ether, Tyloxapol, octoxynol, nonoxynol, are suitable for use in embodiments of the present invention.

Polyoxyethylene-Polyoxypropylene (POE-POP) Block Copolymers

The POE-POP block copolymers are a unique class of polymeric surfactants. The unique structure of the surfactants, with hydrophilic POE and hydrophobic POP moieties in well-defined ratios and positions, provides a wide variety of surfactants suitable for use in embodiments of the present invention. These surfactants are available under various trade names, including Synperonic PE series (ICI); Pluronic® series (BASF), Emkalyx, Lutrol (BASF), Supronic, Monolan, Pluracare, and Plurodac. The generic term for these polymers is "poloxamer" (CAS 9003-11-6). These polymers have the formula: HO(C2H4O)a(C3H6O)b(C2H4O)aH where "a" and "b" denote the number of polyoxyethylene and polyoxypropylene units, respectively.

Preferred hydrophilic surfactants of this class include Poloxamers 108, 188, 217, 238, 288, 338, and 407. In one embodiment, the hydrophobic surfactants in this class include Poloxamers 124, 182, 183, 212, 331, and 335.

Polyester-Polyethylene Glycol Block Copolymers

The polyethylene glycol-polyester block copolymers are a unique class of polymeric surfactants. The unique structure of the surfactants, with hydrophilic polyethylene glycol (PEG) and hydrophobic polyester moieties in well-defined ratios and positions, provides a wide variety of surfactants suitable for use in embodiments of the present invention. The polyesters in the block polymers include poly(L-lactide) (PLLA), poly(DL-lactide)(PDLLA), poly(D-lactide) (PDLA), polycaprolactone (PCL), polyesteramide (PEA), polyhydroxyalkanoates, polyhydroxybutyrate (PHB), polyhydroxybutyrate-co-hydroxyvalerates (PHBV), polyhydroxybutyrate-co-hydroxyhexanoate (PHBHx), polyaminoacids, polyglycolide or polyglycolic acid (PGA), polyglycolide and its copolymers (poly(lactic-co-glycolic acid) with lactic acid, poly(glycolide-co-caprolactone) with .epsilon.-caprolactone, and poly (glycolide-co-trimethylene carbonate) with trimethylene carbonate), and their copolyesters. Examples are PLA-b-PEG, PLLA-b-PEG, PLA-co-PGA-b-PEG, PCL-co-PLLA-b-PEG, PCL-co-PLLA-b-PEG, PEG-b-PLLA-b-PEG, PLLA-b-PEG-b-PLLA, PEG-b-PCL-b-PEG, and other di, tri and multiple block copolymers. The hydrophilic block can be other hydrophilic or water soluble polymers, such as polyvinylalcohol, polyvinylpyrrolidone, polyacrylamide, and polyacrylic acid.

Polyethylene Glycol Graft Copolymers

One example of the graft copolymers is Soluplus (BASF, German). The Soluplus is a polyvinyl caprolactam-polyvinyl acetate-polyethylene glycol graft copolymer. The copolymer is a solubilizer with an amphiphilic chemical structure, which is capable of solubilizing poorly soluble drugs, such as paclitaxel, rapamycin and their derivatives, in aqueous media. Molecular weight of the copolymer is in the range of 90,000-140 000 g/mol.

Polymers, copolymers, block copolymers, and graft copolymers with amphiphilic chemical structures are used as additives in the inventions. The polymers with amphiphilic chemical structures are block or graft copolymers. There are multiple segments (at least two segments) of different repeated units in the copolymers. In some embodiments, one of the segments is more hydrophilic than other segments in the copolymers. Likewise, one of the segments is more hydrophobic than other segments in the copolymers. For example, the polyethylene glycol segment is more hydrophilic than polyvinyl caprolactam-polyvinyl acetate segments in Soluplus (BASF, German). The polyester segment is more hydrophobic than polyethylene glycol segment in polyethylene glycol-polyester block copolymers. PEG is more hydrophilic the PLLA in PEG-PLLA. PCL is more hydrophobic than PEG in PEG-b-PCL-b-PEG. The hydrophilic segments are not limited to polyethylene glycol. Other water soluble polymers, such as soluble polyvinylpyrrolidone and polyvinyl alcohol, can form hydrophilic segments in the polymers with amphilic structure. The copolymers can be used in combination with other additives in the inventions.

Sorbitan Fatty Acid Esters

Sorbitan esters of fatty acids are suitable surfactants for use in embodiments of the present invention. Among these esters, preferred hydrophobic surfactants include sorbitan monolaurate (Arlacel 20), sorbitan monopalmitate (Span-40), and sorbitan monooleate (Span-80), sorbitan monostearate.

The sorbitan monopalmitate, an amphiphilic derivative of Vitamin C (which has Vitamin C activity), can serve two important functions in solubilization systems. First, it possesses effective polar groups that can modulate the microenvironment. These polar groups are the same groups that make vitamin C itself (ascorbic acid) one of the most water-soluble organic solid compounds available: ascorbic acid is soluble to about 30 wt/wt % in water (very close to the solubility of sodium chloride, for example). And second, when the pH increases so as to convert a fraction of the ascorbyl palmitate to a more soluble salt, such as sodium ascorbyl palmitate.

Ionic Surfactants

In another embodiment, ionic surfactants, including cationic, anionic and zwitterionic surfactants, are suitable hydrophilic surfactants for use in embodiments of the present invention.

Anionic surfactants are those that carry a negative charge on the hydrophilic part. The major classes of anionic surfactants used as additives in embodiments of the invention are those containing carboxylate, sulfate, and sulfonate ions. Preferable cations used in embodiments of the invention are sodium, calcium, magnesium, and zinc. The straight chain is typically a saturated or unsaturated C8-C18 aliphatic group. Anionic surfactants with carboxylate ions include aluminum stearate, sodium stearate, calcium stearate, magnesium stearate, zinc stearate, sodium, zinc, and potassium oleates, sodium stearyl fumarate, sodium lauroyl sarcosinate, and sodium myristoyl sarcosinate. Anionic surfactants with sulfate group include sodium lauryl sulfate, sodium dodecyl sulfate, mono-, di-, and triethanolamine lauryl sulfate, sodium lauryl ether sulfate, sodium cetostearyl sulfate, sodium cetearyl sulfate, sodium tetradecyl sulfate, sulfated castor oil, sodium cholesteryl sulfate, sodium tetradecyl sulfate, sodium myristyl sulfate, sodium octyl sulfate, other mid-chain branched or non-branched alkyl sulfates, and ammonium lauryl sulfate. Anionic surfactants with sulfonate group include sodium docusate, dioctyl sodium sulfosuccinate, sodium lauryl sulfoacetate, sodium alkyl benzene sulfonate, sodium dodecyl benzene sulfonate, diisobutyl sodium sulfosuccinate, diamyl sodium sulfosuccinate, di(2-ethylhexyl)sulfosuccinate, and bis(1-methylamyl) sodium sulfosuccinate.

The most common surfactants used in embodiments of the invention are the quaternary ammonium compounds with the general formula R1, R2, R3, R4N+X—, where X— is usually chloride or bromide ion and R represents alkyl groups containing C8-18 atoms. In another embodiment, the surfactants include cetrimide, cetrimonium bromide, benzalkonium chloride, benzethonium chloride, cetylpyridinium chloride, hexadecyltrimethyl ammonium chloride, stearalkonium chloride, lauralkonium chloride, tetradodecyl ammonium chloride, myristyl picolinium chloride, and dodecyl picolinium chloride.

Zwitterionic or amphoteric surfactants include dodecyl betaine, cocamidopropyl betaine, cocoampho clycinate, among others.

In one embodiment, the ionic surfactants include sodium lauryl sulfate, sodium dodecyl sulfate, sodium lauryl ether sulfate, sodium cetostearyl sulfate, sodium cetearyl sulfate, sodium tetradecyl sulfate, sulfated castor oil, sodium cholesteryl sulfate, sodium tetradecyl sulfate, sodium myristyl sulfate, sodium octyl sulfate, other mid-chain branched or non-branched alkyl sulfates, sodium docusate, dioctyl sodium sulfosuccinate, sodium lauryl sulfoacetate, sodium alkyl benzene sulfonate, sodium dodecyl benzene sulfonate, benzalkonium chloride, benzethonium chloride, cetylpyridinium chloride, docecyl trimethyl ammonium bromide, sodium docecylsulfates, dialkyl methylbenzyl ammonium chloride, edrophonium chloride, domiphen bromide, dialkylesters of sodium sulfonsuccinic acid, sodium dioctyl sulfosuccinate, sodium cholate, and sodium taurocholate. These quaternary ammonium salts are preferred additives. They can be dissolved in both organic solvents (such as ethanol, acetone, and toluene) and water. This is especially useful for infill particle coatings because it simplifies the preparation and coating process and has good adhesive properties. HLB values of these surfactants are typically in the range of 20-40, such as sodium dodecyl sulfate (SDS), which has HLB values of 38-40.

Chemical Compounds with One or More Hydroxyl, Amino, Carbonyl, Carboxyl, Acid, Amide or Ester Moieties The chemical compounds with one or more hydroxyl, amino, carbonyl, carboxyl, acid, amide or ester moieties include amino alcohols, hydroxyl carboxylic acid, ester, and anhydrides, hydroxyl ketone, hydroxyl lactone, hydroxyl ester, sugar phosphate, sugar sulfate, ethyl oxide, ethyl glycols, amino acids, peptides, proteins, sorbitan, glycerol, polyalcohol, phosphates, sulfates, organic acids, esters, salts, vitamins, combinations of amino alcohols and organic acids, and their substituted molecules. In another embodiment, hydrophilic chemical compounds with one or more hydroxyl, amino, carbonyl, carboxyl, acid, amide or ester moieties having a molecular weight less than 5,000-10,000 are preferred in certain embodiments. In other embodiments, molecular weight of the additive with one or more hydroxyl, amino, carbonyl, carboxyl, acid, amide, or ester moieties is preferably less than 1000-5,000, or more preferably less than 750-1,000, or most preferably less than 750.

The chemical compounds with amide moieties are important to the coating formulations in certain embodiments of the invention. Urea is one of the chemical compounds with amide groups. Others include biuret, acetamide, lactic acid amide, aminoacid amide, acetaminophen, uric acid, polyurea, urethane, urea derivatives, niacinamide, N-methylacetamide, N,N-dimethylacetamide, sulfacetamide sodium, versetamide, lauric diethanolamide, lauric myristic diethanolamide, N,N-Bis(2-hydroxyethyl stearamide), cocamide MEA, cocamide DEA, arginine, and other organic acid amides and their derivatives. Some of the chemical compounds with amide groups also have one or more hydroxyl, amino, carbonyl, carboxyl acid or ester moieties.

One of the chemical compounds with amide group is a soluble and low molecular weight povidone. The povidone includes Kollidon 12 PF, Kollidon 17 PF, Kollidon 17, Kollidon 25, and Kollidon 30. The Kollidon products consist of soluble and insoluble grades of polyvinylpyrrolidone of various molecular weights and particle sizes, a vinylpyrrolidone/vinyl acetate copolymer and blend of polyvinyl acetate and polyvinylpyrrolidone. The family products are entitled Povidone, Crospovidone and Copovidone. The low molecular weights and soluble Povidones and Copovidones are especially important additives in the inventions. For example, Kollidon 12 PF, Kollidon 17 PF, and Kollidon 17 are very important. The solid povidone can keep integrity of the coating on the infill particles. The low molecular weight povidone can be absorbed or permeated into the diseased tissue. The preferred range of molecular weight of the povidone are less than 54000, less than 11000, less than 7000, less than 4000. They can solublize the water insoluble therapeutic agents. Due to these properties of solid, low molecular weight and tissue absorption/permeability, the Povidone and Copovidone are especially useful in the inventions. The Povidone can be used in combinations with other additives in the inventions. In one embodiment Povidone and a nonionic surfactant (such as PEG-15 12-hydroxystearate (Solutol HS 15), Tween 20, Tween 80, Cremophor RH40, Cremophor EL &ELP), can be formulated with paclitaxel or rapamycin or their analogue as a coating for infill particles, such as balloon catheters.

The chemical compounds with ester moieties are especially important to the coating formulations in certain embodiments. The products of organic acid and alcohol are the chemical compounds with ester groups. The chemical compounds with ester groups often are used as plasticers for polymeric materials. The wide variety of ester chemical compounds includes sebates, adipates, gluterates, and phthalates. The examples of these chemical compounds are bis (2-ethylhexyl) phthalate, di-n-hexyl phthalate, diethyl phthalate, bis(2-ethylhexyl) adipate, dimethyl adipate, dioctyl adipate, dibutyl sebacate, dibutyl maleate, triethyl citrate, acetyl triethyl citrate, trioctyl citrate, trihexyl citrate, butyryl trihexyl citrate, and trimethyl citrate.

Solvents

Solvents for preparing of the surface-modifying coating layer may include, as examples, any combination of one or more of the following: (a) water, (b) alkanes such as hexane, octane, cyclohexane, and heptane, (c) aromatic solvents such as benzene, toluene, and xylene, (d) alcohols such as ethanol, propanol, and isopropanol, diethylamide, ethylene glycol monoethyl ether, Trascutol, and benzyl alcohol (e) ethers such as dioxane, dimethyl ether and tetrahydrofuran, (f) esters/acetates such as ethyl acetate and isobutyl acetate, (g) ketones such as acetone, acetonitrile, diethyl ketone, and methyl ethyl ketone, and (h) mixture of water and organic solvents such as water/ethanol, water/acetone, water/methanol, water/tetrahydrofuran. In one embodiment, the solvent is water and alcohol. In another embodiment, the solvent is water and isopropyl alcohol.

Organic solvents, such as short-chained alcohol, dioxane, tetrahydrofuran, dimethylformamide, acetonitrile, dimethylsulfoxide, etc., are particularly useful solvents in embodiments of the present invention. In other embodiments, two or more solvents may be used in the coating solution.

The term "aqueous medium" is meant water; buffered water including phosphate buffered water, phosphate buffered saline, citrate buffered water, acetate buffered water, water buffered with pharmaceutically acceptable pH controlling agents; water containing salts such as sodium chloride and other pharmaceutically acceptable salts; water containing soluble agents for lyoprotection or cryoprotection such as dextrose, mannitol, trehalose, sucrose, sorbitol, and other pharmaceutically acceptable lyoprotectants and cryoprotectants; water containing soluble agents used to facilitate spray drying such as polyhydroxy-containing compounds such as sugars, polyols, and water containing mixtures of these buffers, agents and compounds. In one embodiment, the aqueous medium can contain one or more soluble surface-active agent. In another embodiment, the aqueous medium can contain one or more surfactants dispersed such as by shear mixing into water or other aqueous medium as described herein.

One or more surfactants utilized in the carrier of this invention is termed as the surfactant system or surface-modifying agent. In those compositions possessing more than one surface-active agent, the principle surface active agent that is present in larger quantity is called the surfactant and the other surface active agents are named as co-surfactants.

In one embodiment, the compositions of this invention include a surfactant system comprising at least one hydrophilic component. The hydrophilic component when optionally used comprises less than about 10% of the carrier system. Examples of hydrophilic components include low-molecular weight monohydric alcohols and preferably ethanol, low-molecular weight polyhydric alcohols, glycols, and glycerol, and mixtures thereof. In a preferred embodiment, the hydrophilic component comprises a pharmaceutically acceptable monohydric or polyhydric alcohol.

A surface treatment agent can be chemically immobilized or adsorbed onto the surface substrate. Chemical linkage or immobilization of surface-treatment agents to a substrate differs from adsorption in that surface treated material has a more uniformly chemically bound reaction product.

For chemical linkage or immobilization, a water-soluble compound having a lipophilic or hydrophilic moiety absorbed onto substrate surface may create the reaction. With the addition of a water-soluble salt of a polyvalent metal for example, a chemical bond can be produced. The reaction product provides a chemical immobilized treatment onto the surface of the particles of the substrate, or a chemically immobilized substrate surface treatment. In contrast, a simple coating of a surface-active agent absent chemical immobilization renders a functional layer, which is absorbed onto the surface of the substrate.

In order to facilitate or enhance linkage or immobilization of surface-treatment agents to substrate, a water-soluble compound having a lipophilic or hydrophilic moiety being absorbed onto the surface of the substrate may create a reaction. As a non-limiting example, addition of a water-soluble salt of a polyvalent metal, such as magnesium, calcium, barium, aluminum, titanium, zinc or a zirconium salt (e.g., zirconium sulfate or chloride), or an alkaline salt, such as a sodium, potassium, lithium, ammonium, or an amine salt, can produce a chemical linkage. The reaction provides a surface-treatment agent chemically immobilized onto the surface of the substrate particle. In contrast, coating a substrate with a surface-treatment agent involves absorbing the surface-treatment agent onto the surface of the substrate.

Surface-treatment agents typically have one or more reactive groups, such as a hydrophilic moiety (e.g., a carboxyl group, a phosphorous group, a sulfur group, a silanol group or a silane group) or a hydrophobic moiety (e.g., a hydrocarbon, a dialkyl(CH3-, C2H5-) polysiloxane, perfluoroalkyl, etc.) in their structure. Surface-treatment agents may or may not contain one or more hydroxyl groups or alkylene oxide moieties, such as ethylene oxide or propylene oxide. Those having hydroxy groups in their structure and hydrophilic characteristics can be delivered after completing the reaction onto the surface. Where there are two or more surface-treatment agents (e.g., first, second, third, fourth, fifth, etc., surface-treatment agents), the surface treatment agents can have a hydrophilic moiety (e.g., two, three, four, five, etc., or more, hydrophilic moieties), a hydrophobic moiety (e.g., two, three, four, five, etc., or more, hydrophobic moieties), or a combination of a hydrophilic moiety and a hydrophobic moiety (e.g., one hydrophilic moiety and a hydrophobic moiety, two hydrophilic moieties and one hydrophobic moiety, two hydrophobic moieties and one hydrophilic moiety, three hydrophilic moieties and one hydrophobic moiety, two hydrophilic moieties and two hydrophobic moieties, three hydrophobic moieties and one hydrophilic moiety, etc.). A first or second surface-treatment agent can be devoid of one or more hydroxyl groups and/or alkylene oxide moieties.

Non-limiting examples of surface treatment agents include acyl collagens, ether carboxylic acids, lactates (e.g., lactic acid), gluconates (e.g., gluconic acid), galacturonic acid, glucarolactone, gallic acid, glucoheptanoic acid, amino acids (such as thereonine and serine) and their salts, acyl amino acids (such as acylglutamates, acylsarcosinates, acylglycinates, and acylalaninates), silanes, 12-hydroxystearic acid, laurylamidobetane, stearyl amphoacetate, lauryl amphopropionate, stearyl amphopropionate, fatty acids and their salts, glycerol phosphate esters (such as lecithin) and polyethylenes with free carboxylic acids.

Examples of anionic surface treatment agents (surfactants) include soaps (fatty acids/alkyl carboxylic acids salt), hydroxy fatty acids, alkyl sulfate, alkyl ether phosphate, polyoxyalkylene alkyl ether sulfate, polyoxyalkylene alkyl ether carboxylate, alkylether phosphate, acyl N-methyl taurate, N-acylamino acid salts (glutamate, sarcosinate, alaninate, glycinate, .beta.-alaninate), acyl peptides (acyl collagen, acyl silk protein), sodium cocoate, stearic acid, isostearic acid, potassium palmitate, sodium laurate, 12-hydroxystearic acid, sodium lauryl sulfate, sodium myristyl phosphate, sodium myristoyl sarcosinate, sodium polyoxyethylene lauryl sulfate, polyoxyethylene myristyl carboxylate, potassium myristate, zinc gluconate, isostearyl sebacic acid, sodium myristoyl taurate, disodium stearoyl glutamate, disodium cocoyl glutamate, arginine lauryl glycinate, sodium dilauramidoglutamide lysine.

Further, the surfactant can be an ionic polymeric surfactant, nonionic polymeric surfactant, polymeric surfactant, anionic polymeric surfactant, or zwitterionic polymeric surfactant. Examples of polymeric surfactants include, but are not limited to, a graft copolymer of a poly(methyl methacrylate) backbone with multiple (at least one) polyethylene oxide (PEO) side chain, polyhydroxystearic acid, an alkoxylated alkyl phenol formaldehyde condensate, a polyalkylene glycol modified polyester with fatty acid hydrophobes, a polyester, semi-synthetic derivatives thereof, or combinations thereof.

In another embodiment, suitable surface active agents or surfactants, are amphipathic molecules that consist of a non-polar hydrophobic portion, usually a straight or branched hydrocarbon or fluorocarbon chain containing 8-18 carbon atoms, attached to a polar or ionic hydrophilic portion. The hydrophilic portion can be nonionic, ionic or zwitterionic. The hydrocarbon chain interacts weakly with the water molecules in an aqueous environment, whereas the polar or ionic head group interacts strongly with water molecules via dipole or ion-dipole interactions. Based on the nature of the hydrophilic group, surfactants are classified into anionic, cationic, zwitterionic, nonionic and polymeric surfactants.

In another embodiment, suitable surfactants include, but are not limited to, ethoxylated nonylphenol comprising 9 to 10 units of ethyleneglycol, ethoxylated undecanol comprising 8 units of ethyleneglycol, polyoxyethylene (20) sorbitan monolaurate, polyoxyethylene (20) sorbitan monopalmitate, polyoxyethylene (20) sorbitan monostearate, polyoxyethylene (20) sorbitan monooleate, sorbitan monolaurate, sorbitan monopalmitate, sorbitan monostearate, sorbitan monooleate, ethoxylated hydrogenated ricin oils, sodium laurylsulfate, a diblock copolymer of ethyleneoxide and propyleneoxide, Ethylene Oxide-Propylene Oxide Block Copolymers, and tetra-functional block copolymers based on ethylene oxide and propylene oxide, Glyceryl monoesters, Glyceryl caprate, Glyceryl caprylate, Glyceryl cocate, Glyceryl erucate, Glyceryl hydroxysterate, Glyceryl isostearate, Glyceryl lanolate, Glyceryl laurate, Glyceryl linolate, Glyceryl myristate, Glyceryl oleate, Glyceryl PABA, Glyceryl palmitate, Glyceryl ricinoleate, Glyceryl stearate, Glyceryl thighlycolate, Glyceryl dilaurate, Glyceryl dioleate, Glyceryl dimyristate, Glyceryl disterate, Glyceryl sesuioleate, Glyceryl stearate lactate, Polyoxyethylene cetyl/stearyl ether, Polyoxyethylene cholesterol ether, Polyoxyethylene laurate or dilaurate, Polyoxyethylene stearate or distearate, polyoxyethylene fatty ethers, Polyoxyethylene lauryl ether, Polyoxyethylene stearyl ether, polyoxyethylene myristyl ether, a steroid, Cholesterol, Betasitosterol, Bisabolol, fatty acid esters of alcohols, isopropyl myristate, Aliphati-isopropyl n-butyrate, Isopropyl n-hexanoate, Isoproppyl n-decanoate, Isoproppyl palmitate, Octyldodecyl myristate, alkoxylated alcohols, alkoxylated acids, alkoxylated amides, alkoxylated sugar derivatives, alkoxylated derivatives of natural oils and waxes, polyoxyethylene polyoxypropylene block copolymers, nonoxynol-14, PEG-8 laurate, PEG-6 Cocoamide, PEG-20 methylglucose sesquistearate, PEG40 lanolin, PEG-40 castor oil, PEG-40 hydrogenated castor oil, polyoxyethylene fatty ethers, glyceryl diesters, polyoxyethylene stearyl ether, polyoxyethylene myristyl ether, and polyoxyethylene lauryl ether, glyceryl dilaurate, glyceryl dimystate, glyceryl distearate, semi-synthetic derivatives thereof, or mixtures thereof.

In another embodiment, suitable surfactants include, but are not limited to, non-ionic lipids, such as glyceryl laurate, glyceryl myristate, glyceryl dilaurate, glyceryl dimyristate, semi-synthetic derivatives thereof, and mixtures thereof.

In additional embodiments, the surfactant is a polyoxyethylene fatty ether having a polyoxyethylene head group ranging from about 2 to about 100 groups, or an alkoxylated alcohol having the structure R5-(OCH2CH2)y-OH, wherein R5 is a branched or unbranched alkyl group having from about 6 to about 22 carbon atoms and y is between about 4 and about 100, and preferably, between about 10 and about 100. Preferably, the alkoxylated alcohol is the species wherein R5 is a lauryl group and y has an average value of 23.

In a different embodiment, the surfactant is an alkoxylated alcohol, which is an ethoxylated derivative of lanolin alcohol. In another embodiment, the ethoxylated derivative of lanolin alcohol is laneth-10, which is the polyethylene glycol ether of lanolin alcohol with an average ethoxylation value of 10.

In another embodiment, suitable nonionic surfactants include, but are not limited to, an ethoxylated surfactant, an alcohol ethoxylated, an alkyl phenol ethoxylated, a fatty acid ethoxylated, a monoalkaolamide ethoxylated, a sorbitan ester ethoxylated, a fatty amino ethoxylated, an ethylene oxide-propylene oxide copolymer, Bis(polyethylene glycol bis[imidazoyl carbonyl]), nonoxynol-9, Bis(polyethylene glycol bis[imidazoyl carbonyl]), Brij® 35, Brij® 56, Brij® 72, Brij® 76, Brij® 92V, Brij® 97, Brij® 58P, Cremophor® EL, Decaethylene glycol monododecyl ether, N-Decanoyl-N-methylglucamine, n-Decyl alpha-D-glucopyranoside, Decyl beta-D-maltopyranoside, n-Dodecanoyl-N-methylglucamide, n-Dodecyl alpha-D-maltoside, n-Dodecyl beta-D-maltoside, n-Dodecyl beta-D-maltoside, Heptaethylene glycol monodecyl ether, Heptaethylene glycol monododecyl ether, Heptaethylene glycol monotetradecyl ether, n-Hexadecyl beta-D-maltoside, Hexaethylene glycol monododecyl ether, Hexaethylene glycol monohexadecyl ether, Hexaethylene glycol monooctadecyl ether, Hexaethylene glycol monotetradecyl ether, Igepal CA-630, Igepal CA-630, Methyl-6-O—(N-heptylcarbamoyl)-alpha-D-glucopyranoside, Nonaethylene glycol monododecyl ether, N—N-Nonanoyl-N-methylglucamine, Octaethylene glycol monodecyl ether, Octaethylene glycol monododecyl ether, Octaethylene glycol monohexadecyl ether, Octaethylene glycol monooctadecyl ether, Octaethylene glycol monotetradecyl ether, Octyl-beta-D-glucopyranoside, Pentaethylene glycol monodecyl ether, Pentaethylene glycol monododecyl ether, Pentaethylene glycol monohexadecyl ether, Pentaethylene glycol monohexyl ether, Pentaethylene glycol monooctadecyl ether, Pentaethylene glycol monooctyl ether, Polyethylene glycol diglycidyl ether, Polyethylene glycol ether W-1, Polyoxyethylene 10 tridecyl ether, Polyoxyethylene 100 stearate, Polyoxyethylene 20 isohexadecyl ether, Polyoxyethylene 20 oleyl ether, Polyoxyethylene 40 stearate, Polyoxyethylene 50 stearate, Polyoxyethylene 8 stearate, Polyoxyethylene bis(imidazolyl carbonyl), Polyoxyethylene 25 propylene glycol stearate, Saponin from Quillaja bark, Span® 20, Span® 40, Span® 60, Span® 65, Span® 80, Span® 85, Tergitol, Type 15-S-12, Tergitol, Type 15-S-30, Tergitol, Type 15-S-5, Tergitol, Type 15-S-7, Tergitol, Type 15-S-9, Tergitol, Type NP-10, Tergitol, Type NP-4, Tergitol, Type NP-40, Tergitol, Type NP-7, Tergitol, Type NP-9, Tergitol, Tergitol, Type TMN-10, Tergitol, Type TMN-6, Tetradecyl-beta-D-maltoside, Tetraethylene glycol monodecyl ether, Tetraethylene glycol monododecyl ether, Tetraethylene glycol monotetradecyl ether, Triethylene glycol monodecyl ether, Triethylene glycol monododecyl ether, Triethylene glycol monohexadecyl ether, Triethylene glycol monooctyl ether, Triethylene glycol monotetradecyl ether, Triton CF-21, Triton CF-32, Triton DF-12, Triton DF-16, Triton GR-5M, Triton QS-15, Triton QS-44, Triton X-100, Triton X-102, Triton X-15, Triton X-151, Triton X-200, Triton X-207, Triton® X-114, Triton® X-165, Triton® X-305, Triton® X-405, Triton® X-45, Triton® X-705-70, TWEEN® 20, TWEEN® 21, TWEEN® 40, TWEEN® 60, TWEEN® 61, TWEEN® 65, TWEEN® 80, TWEEN® 81, TWEEN® 85, Tyloxapol, n-Undecyl beta-D-glucopyranoside, semi-synthetic derivatives thereof, or combinations thereof.

In addition, the nonionic surfactant can be a poloxamer. Poloxamers are polymers made of a block of polyoxyethylene, followed by a block of polyoxypropylene, followed by a block of polyoxyethylene. The average number of units of polyoxyethylene and polyoxypropylene varies based on the number associated with the polymer. For example, the smallest polymer, Poloxamer 101, consists of a block with an average of 2 units of polyoxyethylene, a block with an average of 16 units of polyoxypropylene, followed by a block with an average of 2 units of polyoxyethylene. Poloxamers range from colorless liquids and pastes to white solids. In cosmetics and personal care products, Poloxamers are used in the formulation of skin cleansers, bath products, shampoos, hair conditioners, mouthwashes, eye makeup remover and other skin and hair products. Examples of Poloxamers include, but are not limited to, Poloxamer 101, Poloxamer 105, Poloxamer 108, Poloxamer 122, Poloxamer 123, Poloxamer 124, Poloxamer 181, Poloxamer 182, Poloxamer 183, Poloxamer 184, Poloxamer 185, Poloxamer 188, Poloxamer 212, Poloxamer 215, Poloxamer 217, Poloxamer 231, Poloxamer 234, Poloxamer 235, Poloxamer 237, Poloxamer 238, Poloxamer 282, Poloxamer 284, Poloxamer 288, Poloxamer 331, Poloxamer 333, Poloxamer 334, Poloxamer 335, Poloxamer 338, Poloxamer 401, Poloxamer 402, Poloxamer 403, Poloxamer 407, Poloxamer 105 Benzoate, and Poloxamer 182 Dibenzoate.

In another embodiment, suitable surfactants include, but are not limited to, a quarternary ammonium compound, an alkyl trimethyl ammonium chloride compound, a dialkyl dimethyl ammonium chloride compound, a halogen-containing compound, such as cetylpyridinium chloride, Benzalkonium chloride, Benzalkonium chloride, Benzyldimethylhexadecylammonium chloride, Benzyldimethyltetradecylammonium chloride, Benzyldodecyldimethylammonium bromide, Benzyltrimethylammonium tetrachloroiodate, Dimethyldioctadecylammonium bromide, Dodecylethyldimethylammonium bromide, Dodecyltrimethylammonium bromide, Dodecyltrimethylammonium bromide, Ethylhexadecyldimethylammonium bromide, Girard's reagent T, Hexadecyltrimethylammonium bromide, Hexadecyltrimethylammonium bromide, N,N',N'-Polyoxyethylene(10)-N-tallow-1,3-diaminopropane, Thonzonium bromide, Trimethyl(tetradecyl)ammonium bromide, 1,3,5-Triazine-1,3,5(2H,4H,6H)-triethanol, 1-Decanaminium, N-decyl-N,N-dimethyl-, chloride, Didecyl dimethyl ammonium chloride, 2-(2-(p-(Diisobutyl)cresosxy)ethoxy)ethyl dimethyl benzyl ammonium chloride, 2-(2-(p-(Diisobutyl)phenoxy)ethoxy)ethyl dimethyl benzyl ammonium chloride, Alkyl 1 or 3 benzyl-1-(2-hydroxethyl)-2-imidazolinium chloride, Alkyl bis(2-hydroxyethyl)benzyl ammonium chloride, Alkyl demethyl benzyl ammonium chloride, Alkyl dimethyl 3,4-dichlorobenzyl ammonium chloride (100% C12), Alkyl dimethyl 3,4-dichlorobenzyl ammonium chloride (50% C14, 40% C12, 10% C16), Alkyl dimethyl 3,4-dichlorobenzyl ammonium chloride (55% C14, 23% C12, 20% C16), Alkyl dimethyl benzyl ammonium chloride, Alkyl dimethyl benzyl ammonium chloride (100% C14), Alkyl dimethyl benzyl ammonium chloride (100% C16), Alkyl dimethyl benzyl ammonium chloride (41% C14, 28% C12), Alkyl dimethyl benzyl ammonium chloride (47% C12, 18% C14), Alkyl dimethyl benzyl ammonium chloride (55% C16, 20% C14), Alkyl dimethyl benzyl ammonium chloride (58% C14, 28% C16), Alkyl dimethyl benzyl ammonium chloride (60% C14, 25% C12), Alkyl dimethyl benzyl ammonium chloride (61% C11, 23% C14), Alkyl dimethyl benzyl ammonium chloride (61% C12, 23% C, 14), Alkyl dimethyl benzyl ammonium chloride (65% C12, 25% C14), Alkyl dimethyl benzyl ammonium chloride (67% C12, 24% C14), Alkyl dimethyl benzyl ammonium chloride (67% C12, 25% C14), Alkyl dimethyl benzyl ammonium chloride (90% C14, 5% C12), Alkyl dimethyl benzyl ammonium chloride (93% C14, 4% C12), Alkyl dimethyl benzyl ammonium chloride (95% C16, 5% C18), Alkyl didecyl dimethyl ammonium chloride, Alkyl dimethyl benzyl ammonium chloride (C12-16), Alkyl dimethyl benzyl ammonium chloride (C12-18), dialkyl dimethyl benzyl ammonium chloride, Alkyl dimethyl dimethybenzyl ammonium chloride, Alkyl dimethyl ethyl ammonium bromide (90% C14, 5% C16, 5% C12), Alkyl dimethyl ethyl ammonium bromide (mixed alkyl and alkenyl groups as in the fatty acids of soybean oil), Alkyl dimethyl ethylbenzyl ammonium chloride, Alkyl dimethyl ethylbenzyl ammonium chloride (60% C, 14), Alkyl dimethyl isopropylbenzyl ammonium chloride (50% C12, 30% C14, 17% C16, 3% C18), Alkyl trimethyl ammonium chloride (58% C18, 40% C16, 1% C14, 1% C12), Alkyl trimethyl ammonium chloride (90% C18, 10% C16), Alkyldimethyl(ethylbenzyl) ammonium chloride (C12-18), Di-(C8-10)-alkyl dimethyl ammonium chlorides, Dialkyl dimethyl ammonium chloride, Dialkyl methyl benzyl ammonium chloride, Didecyl dimethyl ammonium chloride, Diisodecyl dimethyl ammonium chloride, Dioctyl dimethyl ammonium chloride, Dodecyl bis(2-hydroxyethyl) octyl hydrogen ammonium chloride, Dodecyl dimethyl benzyl ammonium chloride, Dodecylcarbamoyl methyl dimethyl benzyl ammonium chloride, Heptadecyl hydroxyethylimidazolinium chloride, Hexahydro-1,3,5-tris(2-hydroxyethyl)-s-triazine, Myristalkonium chloride (and) Quat RNIUM 14, N,N-Dimethyl-2-hydroxypropylammonium chloride polymer, n-Tetradecyl dimethyl benzyl ammonium chloride monohydrate, Octyl decyl dimethyl ammonium chloride, Octyl dodecyl dimethyl ammonium chloride, Octyphenoxyethoxyethyl dimethyl benzyl ammonium chloride, Oxydiethylenebis(alkyl dimethyl ammonium chloride), Trimethoxysily propyl dimethyl octadecyl ammonium chloride, Trimethoxysilyl quats, Trimethyl dodecylbenzyl ammonium chloride, semi-synthetic derivatives thereof, and combinations thereof.

In another embodiment, suitable halogen-containing compounds include, but are not limited to, cetylpyridinium halides, cetyltrimethylammonium halides, cetyldimethylethylammonium halides, cetyldimethylbenzylammonium halides, cetyltributylphosphonium halides, dodecyltrimethylammonium halides, or tetradecyltrimethylammonium halides. In some particular embodiments, suitable halogen containing compounds comprise, but are not limited to, cetylpyridinium chloride (CPC), cetyltrimethylammonium chloride, cetylbenzyldimethylammonium chloride, cetylpyridinium bromide (CPB), cetyltrimethylammonium bromide (CTAB), cetyidimethylethylammonium bromide, cetyltributylphosphonium bromide, dodecyltrimethylammonium bromide, and tetrad ecyltrimethylammonium bromide. In particularly preferred embodiments, the halogen-containing compound is CPC, although the compositions of the present invention are not limited to formulation with a particular containing compound.

In another embodiment, suitable anionic surfactants include, but are not limited to, a carboxylate, a sulphate, a sulphonate, a phosphate, chenodeoxycholic acid, chenodeoxycholic acid sodium salt, cholic acid, ox or sheep bile, Dehydrocholic acid, Deoxycholic acid, Deoxycholic acid, Deoxycholic acid methyl ester, Digitonin, Digitoxigenin, N,N-Dimethyldodecylamine N-oxide, Docusate sodium salt, Glycochenodeoxycholic acid sodium salt, Glycocholic acid hydrate, synthetic, Glycocholic acid sodium salt hydrate, synthetic, Glycodeoxycholic acid monohydrate, Glycodeoxycholic acid sodium salt, Glycolithocholic acid 3-sulfate disodium salt, Glycolithocholic acid ethyl ester, N-Lauroylsarcosine sodium salt, N-Lauroylsarcosine solution, N-Lauroylsarcosine solution, Lithium dodecyl sulfate, Lithium dodecyl sulfate, Lithium dodecyl sulfate, Lugol solution, Niaproof 4, Type 4,1-Octanesulfonic acid sodium salt, Sodium 1-butanesulfonate, Sodium 1-decanesulfonate, Sodium 1-decanesulfonate, Sodium 1-dodecanesulfonate, Sodium 1-heptanesulfonate anhydrous, Sodium 1-heptanesulfonate anhydrous, Sodium 1-nonanesulfonate, Sodium 1-propanesulfonate monohydrate, Sodium 2-bromoethanesulfonate, Sodium cholate hydrate, Sodium choleate, Sodium deoxycholate, Sodium deoxycholate monohydrate, Sodium dodecyl sulfate, Sodium hexanesulfonate anhydrous, Sodium octyl sulfate, Sodium pentanesulfonate anhydrous, Sodium taurocholate, Taurochenodeoxycholic acid sodium salt, Taurodeoxycholic acid sodium salt monohydrate, Taurohyodeoxycholic acid sodium salt hydrate, Taurolithocholic acid 3-sulfate disodium salt, Tauroursodeoxycholic acid sodium salt, Trizma® dodecyl sulfate, TWEEN® 80, Ursodeoxycholic acid, semi-synthetic derivatives thereof, and combinations thereof.

In another embodiment, suitable zwitterionic surfactants include, but are not limited to, an N-alkyl betaine, lauryl amindo propyl dimethyl betaine, an alkyl dimethyl glycinate, an N-alkyl amino propionate, CHAPS, minimum 98% (TLC), CHAPS, minimum 98% (TLC), CHAPS, for electrophoresis, minimum 98% (TLC), CHAPSO, minimum 98%, CHAPSO, CHAPSO, for electrophoresis, 3-(Decyldimethylammonio)propanesulfonate inner salt, 3-Dodecyldimethylammonio)propanesulfonate inner salt, 3-(Dodecyldimethylammonio)propanesulfonate inner salt, 3-(N,N-Dimethylmyristylammonio)propanesulfonate, 3-(N,N-Dimethyloctadecylammonio)propanesulfonate, 3-(N,N-Dimethyloctylammonio)propanesulfonate inner salt, 3-(N,N-Dimethylpalmitylammonio)propanesulfonate, semi-synthetic derivatives thereof, and combinations thereof.

In some embodiments of the invention, the coating composition comprises a surfactant, and the concentration of the surfactant is less than about 5.0% and greater than about 0.001%. In yet another embodiment of the invention, the coating composition comprises a surfactant, and the concentration of the surfactant is selected from the group consisting of less than about 5%, less than about 4.5%, less than about 4.0%, less than about 3.5%, less than about 3.0%, less than about 2.5%, less than about 2.0%, less than about 1.5%, less than about 1.0%, less than about 0.90%, less than about 0.80%, less than about 0.70%, less than about 0.60%, less than about 0.50%, less than about 0.40%, less than about 0.30%, less than about 0.20%, or less than about 0.10%.

Further, the concentration of the agent in the coating composition is greater than about 0.002%, greater than about 0.003%, greater than about 0.004%, greater than about 0.005%, greater than about 0.006%, greater than about 0.007%, greater than about 0.008%, greater than about 0.009%, greater than about 0.010%, or greater than about 0.001%. In one embodiment, the concentration of the agent in the coating composition is less than about 5.0% and greater than about 0.001%.

In additional particular embodiments in which there are two or more surface treatment agents, one or more optionally chemically immobilized onto the surface of a pigment, a first and second surface treatment agent can have a relatively high hydrophilic-lipophilic balance (HLB) and a second surface treatment agent can have a relatively low HLB. In an exemplary embodiment, a first surface-treatment agent has a hydrophilic-lipophilic balance of about 10 or higher (e.g., 11, 12, 13, 14, 15, 16, 17, 18, etc.) and contains at least one functional group selected from the group consisting of a carboxyl group or a salt of a carboxyl group, a phosphorous group or a salt of a phosphorous group, a sulfur group or a salt of a sulfur group, and a silane group; and a second surface-treatment agent has a hydrophilic-lipophilic balance of about 9 or lower (e.g., 8, 7, 6, 5, 4, 3, etc.) and contains at least one functional group; and the difference in the hydrophilic-lipophilic balance values between the first and the second surface-treatment agent is at least about 5 (e.g., 6, 7, 8, 9, 10, 11, 12, 13, 14, 15, 16, 17, 18, 19, etc.). In various aspects, a functional group is selected from a carboxyl group or a salt of a carboxyl group, a phosphorous group or a salt of a phosphorous group, a sulfur group or a salt of a sulfur group. In another embodiment, a first surface-treatment agent has a hydrophilic-lipophilic balance ranging from about 14 to 18. In an additional embodiment, a second surface-treatment agent has a hydrophilic-lipophilic balance ranging from about 1 to 4. In particular aspects, a first surface-treatment agent contains one or more hydroxyl groups or alkylene oxide moieties (e.g., an ethylene oxide moiety, a propylene oxide moiety, or a combination thereof).

If desired, additional surface-treatment agents may also be added. For example, more than one hydrophilic surface treatment agent and more than one hydrophobic surface treatment agent may be used. Additional surface treatment agents can be adhered to the substrate to impart additional functionality of these surface treatment agents. The additional surface treatment agents need not be within the genera of first and second surface treatment agents described herein.

In another embodiment of the invention, the coating composition comprises at least one surfactant and at least one non-surfactant. The non-surfactant is a nonionic surfactant, such as a polysorbate (Tween), such as polysorbate 80 or polysorbate 20. In one embodiment, the non-ionic surfactant is present in a concentration of about 0.05% to about 7.0%, or the non-ionic surfactant is present in a concentration of about 0.3% to about 4%. In yet another embodiment of the invention, the coating composition comprises a surfactant present in a concentration of about 0.01% to about 2%, in combination with a nonionic surfactant.

In one embodiment of the invention, the coating composition comprises triethanolamine. In another embodiment, the coating composition comprises triethanolamine and a solvent. In another embodiment, the solvent is an alcohol. In another embodiment, the solvent is an alcohol is in an aqueous medium. In another embodiment, the coating composition comprises triethanolamine and isopropyl alcohol in an aqueous medium.

Examples of coatings are triethanolamine, propylene glycol, titanium dioxide and a variety of different flouro surfactants. In one embodiment, the surfactants are those that are biocompatible for use in aquatic weed control or in situations where some of the surfactant is likely to be introduce into ground water such as materials with trade names like Carbowet® 13-40, Cide Kick (d,l-limonene), Cygnet Plus (d,-limonene and related isomers), EnviroGem, Klucel, Plex Mate, Pluronics, SilEnergy (an organosilicone surfactant, polyalkyleneoxide modified polydimethyisloloxane and nonionic surfactants), Suretech 827 and 830, Triton.

In another embodiment, the surfactant is selected from ones that are biocompatible including NPE-based surfactants, POEA (polyethoxylated tallow amine), Agri-Dex, LI-700, R-11, Latron AG-98, and Latron AG-98 AG, surfactants in Glyphosate, and Polyglycol 26-2 in Picloram. Other adjuvants/surfactants include the following:

Surfactants including Ethoxylated fatty amines (Cationic) such as Entry™ II (Monsanto Company) and POEA—Roundup® has 15 percent POEA. Alkylphenol ethoxylate-based surfactants (non-ionic) such as R-11® Spreader Activator (Wilbur-Ellis Company), Activator 90 (Loveland Industries), X-77® (Loveland Industries), Latron AG-98™ (N) (Dow AgroSciences LLC), Latron AG-98™ (Dow AgroSciences LLC), Cide-Kick®, and Cide-Kick® II™ (Brewer International). These surfactants usually include an alcohol as a solvent (isopropanol (X-77®, AG-98™), butanol (R-11®, AG-98™ (N)), glycol (AG-98™ (N), Activator 90)), a silicone defoamer (polydimethylsiloxane), and water.

Alcohol ethoxylate-based surfactants (non-ionic) such as Activator N.F. (Loveland Industries).

Silicone-Based Surfactants: Also known as organosilicones, these are increasing in popularity because of their superior spreading ability. This class contains a polysiloxane chain. Some of these are a blend of non-ionic surfactants (NIS) and silicone while others are entirely silicone. Examples include Sylgard® 309 (Wilbur-Ellis Company)—silicones, Freeway® (Loveland Industries)—silicone blend, Dyne-Amic® (Helena Chemical Company)—silicone blend, Silwet L-77® (Loveland and Helena)—silicones. Blends normally include an alcohol ethoxylate, a defoamer, and propylene glycol.

Oils: Oil adjuvants are made up of either petroleum, vegetable, or methylated vegetable or seed oils plus an emulsifier for dispersion in water.

Vegetable Oils:

The methylated seed oils are formed from common seed oils, such as canola, soybean, or cotton. These are comparable in performance to crop oil concentrates. In addition, silicone-seed oil blends are also available that take advantage of the spreading ability of the silicones and the penetrating characteristics of the seed oils.

The U.S. Food and Drug Administration (FDA) considers methyl and ethyl esters of fatty acids produced from edible fats and oils to be food grade additives (CFR 172.225). Because of the lack of exact ingredient statements on these surfactants, it is not always clear whether the oils that are used in them meet the U.S. FDA standard. These include: MSO® Concentrate Methylated Seed Oil (Loveland Industries), Hasten® (Wilbur-Ellis Company), surfactant in Pathfinder™ II (a triclopyr formulation), improved JLB Oil Plus (Brewer International), Cide-Kick and Cide-Kick II (Brewer International), and blends of vegetable oils and silicone-based surfactants, Syl-Tac™ (Wilbur-Ellis Company), Phase™ (Loveland Industries)

Crop Oils and Crop Oil Concentrates:

These are normally derivatives of paraffin-based petroleum oil. Crop oils are generally 95 to 98 percent oil with 1 to 2 percent surfactant/emulsifier. Crop oil concentrates are a blend of crop oils (80 to 85 percent) and a nonionic surfactant (15 to 20 percent). The purpose of the nonionic surfactant in this mixture is to emulsify the oil in the spray solution and lower the surface tension of the overall spray solution. See: kerosene (found in the triclopyr formulation Garlon 4), Agri-Dex® (Helena Chemical Co. or Setre Chemical Co.) and Red-Top Mor-Act® (Wilbur-Ellis Company)

Special Purpose or Utility Adjuvants: The special purpose or utility adjuvants are used to offset or correct certain conditions associated with mixing and application such as impurities in the spray solution, extreme pH levels, and drift. These adjuvants include acidifiers, buffering agents, water conditioners, anti-foaming agents, compatibility agents, and drift control agents. The pH of most solutions is not high or low enough for significant chemical breakdown in the spray tank. In another embodiment, pH-reducing adjuvants (such as LI-700® Surfactant Penetrant Acidifier) may be used.

Water-Soluble Polyvalent Metal Compound

In one embodiment, the surface-treatment agent comprises a water-soluble polyvalent metal compound (for example, ammonium zirconyl carbonate etc.) described later and optionally water. If necessary, the coating liquid may further comprise other ingredients. In another embodiment, the compositions may further comprise one or more additional surface treatment agents as described above.

The water-soluble polyvalent metal compound used in the invention is preferably a trivalent or higher-valent metal compound. The metal compound may be, for example, a water-soluble salt of a metal selected from calcium, barium, manganese, copper, cobalt, nickel, aluminum, iron, zinc, zirconium, chromium, magnesium, tungsten and molybdenum.

Examples of such compounds include calcium acetate, calcium chloride, calcium formate, calcium sulfate, calcium butyrate, barium acetate, barium sulfate, barium phosphate, barium oxalate, barium naphthoresorcin carboxylate, barium butyrate, manganese chloride, manganese acetate, manganese formate.2H2O, ammonium manganese sulfate.6H2O, cupper(II) chloride, cupper(II) ammonium chloride.2H2O, copper sulfate, copper(II) butyrate, copper oxalate, copper phthalate, copper citrate, copper gluconate, copper naphthenate, cobalt chloride, cobalt thiocyanate, cobalt sulfate, cobalt(II) acetate, cobalt napthenate, nickel sulfate-6H2O, nickel chloride.6H2O, nickel acetate.4H2O, ammonium nickel sulfate.6H2O, dinickel amidosulfate.4H2O, nickel sulfaminate, nickel 2-ethyl hexanoate, aluminum sulfate, aluminum sulfite, aluminum thiosulfate, polyaluminum chloride, aluminum nitrate-9H2O, aluminum chloride.6H2O, aluminum acetate, aluminum lactate, basic aluminum thioglycolate, ferrous bromide, ferrous chloride, ferric chloride, ferrous sulfate, ferric sulfate, iron(III) nitrate, iron(III) lactate.3H2O, iron(III) ammonium trioxalate.3H2O, zinc bromide, zinc chloride, zinc nitrate.6H2O, zinc sulfate, zinc acetate, zinc lactate, zirconyl acetate, zirconyl chloride, zirconyl oxide chloride.8H2O, zirconyl hydroxychloride, chrome acetate, chrome sulfate, magnesium acetate, magnesium oxalate, magnesium sulfate, magnesium chloride.6H2O, magnesium citrate.9H2O, sodium phosphotungstate, tungsten sodium citrate, 12-tungustophosphoric acid.nH2O, 12-tungstosilicic acid-26H2O, molybdenum chloride, and 12-molybdophoshoric acid.nH2O. Two or more water-soluble polyvalent metal compounds may be used in combination. In the invention, the water-soluble polyvalent metal compound has a solubility in water of 1 wt % or more at 20 degree C.

The water-soluble polyvalent metal compound is preferably a compound comprising aluminum or a metal (for example, zirconium, titanium) of group 4A of Periodic Table. The water-soluble polyvalent metal compound is particularly preferably a water-soluble aluminum compound. The water-soluble aluminum compound may be an inorganic aluminum salt, and examples thereof include aluminum chloride and hydrates thereof, aluminum sulfate and hydrates thereof, and aluminum alum. The water-soluble aluminum compound may also be a basic polyaluminum hydroxide compound, which is an inorganic aluminum-containing cationic polymer.

In an additional embodiment, metal agents may be used as the surface-treatment agent for treating the surface of the hydrophobic materials. In one embodiment, the polyvalent metals or metal complexes that cross-link individual polymer molecules to each other. The amount of metal cross-linking agents employed will vary depending upon the amount of water-borne polymer and the acid number of the polymer. In one embodiment, suitable polyvalent metals include zirconium, titanium, hafnium, chromium, zinc, aluminum, or a mixture of any two or more thereof. In one embodiment, zirconium is especially well suited as a metal cross-linking agent.

The inorganic metal used in the invention refers to a metal compound which has solubility with respect to a surfactant and is capable of forming a metal ion. The metal compound is preferably a salt or a complex, and more preferably a salt or complex of a polyvalent metal.

Specific examples of the inorganic oxide include salts or complexes of a metal selected from the group consisting of magnesium, aluminum, calcium, scandium, titanium, vanadium, chromium, manganese, iron, cobalt, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Specifically, examples thereof include calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, copper(II) chloride, ammonium copper(II) chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, nickel amidosulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, iron(II) bromide, iron(II) chloride, iron(III) chloride, iron(II) sulfate, iron(III) sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphorustungstate, sodium tungsten citrate, 12 tungstophosphoric acid n-hydrate, 12 tungstosilicic acid 26 hydrate, molybdenum chloride, 12 molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, and bismuth nitrate.

In one embodiment, the inorganic oxide used in the present invention is a compound including aluminum, a compound including titanium, a compound including zirconium, or a metal compound including an element belonging to Group IIIB of the periodic table.

In one embodiment, the metal agent is a salt or complex of ammonia, acetate, propionate, sulfate, carbonate, nitrate, phosphate, tartrate, acetylacetonate, oxide, or a mixture of any two or more thereof. In one embodiment, the metal cross-linking agents include ammonium zirconium carbonate, zirconium acetylacetonate, zirconium acetate, zirconium carbonate, zirconium sulfate, zirconium phosphate, potassium zirconium carbonate, zirconium sodium phosphate, zirconium tartrate, zinc oxide, and other combinations of the above polyvalent metals and counter ions. Mel Chemicals' Bacote (ammonium zirconium carbonate) and Zirmel (potassium zirconium carbonate) (products are well established formulations. Similarly, organic titanates such as titanium acetylacetonate and titanium lactate chelate can be used.

The zirconium (Zr) complex salt is a complex salt that forms the anionic Zr complex ion in a solution or in a surfactant.

The anionic Zr complex ion preferably has an anionic ligand. Examples of the anionic ligand include $CO_3^{2-}$ (carbonato), $OH^-$ (hydroxo), and the like. The anionic Zr complex ion may be $[Zr(CO_3)_2(OH)_2]^{2-}$. A counter ion in the Zr complex salt may be an alkali metal ion or a quaternary ammonium ion. Examples of the alkali metal ion include sodium ion ($Na^+$), lithium ion ($Li^+$), potassium ion ($K^+$), and the like. Examples of the quaternary ammonium ion include ammonium ion ($NH_4^+$), tetramethylammonium ion, tetraethylammonium ion, tetrabutylammonium ion, and the like. Examples of the Zr complex salt include $K_2[Zr(CO_3)_2(OH)_2]$, $(NH_4)_2[Zr(CO_3)_2(OH)_2]$, and the like. For example, commercially available Zr complex salt may be used. Examples of the commercially available Zr complex salt include "ZIRMEL 1000" and "BAYCOAT 20" (Nippon Light Metal Co., Ltd.); and the like.

The solid content of the Zr complex salt relative to the total amount of the water-based surfactant is, for example, in the range from about 0.1 wt % to about 80 wt %, from about 0.1 wt % to about 60 wt %, from about 0.1 wt % to about 25 wt %, from about 0.1 wt % to about 18 wt %, from about 0.1 wt % to about 10 wt %, and from about 0.1 wt % to about 4 wt %.

The amount of the metal cross-linking agent used in inventive compositions will vary with the nature of the particle and polyvalent metal.

In accordance with one embodiment, the invention is directed towards an aqueous surfactant composition comprising at least one of dispersed polyvalent metal oxide particle dispersion, wherein the surfactant composition has a pH of greater than 4 and the polyvalent metal oxide particles have a negative zeta potential at the pH of the composition. The size of the metal oxide particles preferably is less than 100 nm, more preferably less than about 50 nm, and may have a surface treatment that maintains the zeta potential in the desired range.

As an alternative approach to adding polyvalent metal ions in salt form is the use of a form of the metal in the form of metal oxide particles may be employed to release the metal ion at an adequate level, where polyvalent metal oxide particles are employed which have a negative zeta potential at the pH of the surfactant composition.

Most particles in an aqueous environment have some surface charge that can cause particle repulsion and stabilize the particles from flocculation or agglomeration if the charge is large enough. Charged particles in an aqueous environment are often characterized by their movement in an electric field or electrokinetic behavior. Particles with a charged surface will attract ions of the opposite charge to the surface to form a double layer of charge that dissipates with distance into the surrounding bulk medium. This apparent charge is dependent on both the nature of the particle surface and the properties of the surrounding medium including pH, viscosity, and salt concentration.

The surfactants of the present invention are aqueous-based surfactants. By aqueous-based it is meant that the surfactant comprises mainly water as the carrier medium for the remaining surfactant components. In a preferred embodiment, the surfactants of the present invention comprise at least about 50-weight percent water. Surfactant-based surfactants are defined as surfactants containing at least a dispersion of water-insoluble surfactant particles.

The surfactant compositions of the present invention contain low levels, relative to the colorant and polymer levels, of dispersions of metal oxides such as alumina and zinc oxide that have a negative zeta potential at a pH of greater than 4. These metal oxide dispersions may include a surface treatment or addenda such as a surfactant or polymer that provides a stable negative zeta potential to the particles over the pH range of interest. These metal oxide dispersions can be added to surfactant compositions containing negatively charged surfactants and polymers with no significant destabilizing interaction. Preferred levels of addition of such metal oxide particles is from 10 to 10,000 ppm, more preferably from 50 to 1000 ppm. While higher levels within such ranges are possible, generally levels below about 500 ppm are sufficient.

It is beneficial that the particles are small enough so that they have a high surface area. The particle size preferably should be less than 100 nm, and more preferably less than or equal to about 50 nm.

Polyvalent metal oxide particles employed in the invention may contain aluminum or other polyvalent metal ions that can form metal oxide bonds. Aluminum ion in particular has been found to be effective to inhibit aqueous dissolution of silicon oxide-based glass. Other polyvalent metal ions such as zinc, zirconium, hathium, and titanium may also be useful. The surfactants of the present invention preferably comprise surfactant particles dispersed in the aqueous carrier.

As noted, the surfactants of the invention may comprise self-dispersing surfactants that are dispersible without the use of a dispersant. Surfactants of this type are those that have been subjected to a surface treatment such as oxidation/reduction, acid/base treatment, or functionalization through coupling chemistry. The surface treatment can render the surface of the surfactant with anionic, cationic or non-ionic groups, as described above.

The surfactant particles are preferably dispersed by a polymeric or small molecule dispersant in an amount sufficient to provide stability in the aqueous suspension and subsequent surfactant. The amount of dispersant relative to surfactant is a function of the desired particle size and related surface area of the fine particle dispersion. It is understood that the amount of dispersant and relative ratios of the monomer constituents of a polymeric dispersant can be varied to achieve the desired particle stability and surfactant firing performance for a given surfactant, as it is known that surfactants can vary in composition and affinity for a polymeric dispersant.

The surfactants used in the surfactant composition of the invention may be present in any effective amount, generally from 0.1 to 10% by weight, and preferably from 0.5 to 6% by weight, more preferably from 1 to 4% by weight.

Surfactant compositions useful in the invention can also comprise a humectant in order to achieve high frequency firing with low variability. Representative examples of humectants which may be employed in the present invention include; (1) triols, such as; glycerol, 1,2,6-hexanetriol, 2-ethyl-2-hydroxymethyl-propane diol, trimethylolpropane, alkoxylated triols, alkoxylated pentaerythritols, saccharides and sugar alcohols, (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol, or a mixture thereof. Typical aqueous-based surfactant compositions useful in the invention may contain 2-25 weight percent humectant(s), more preferably from about 6-20% humectant, most preferably from about 8-15% humectant.

The surfactant compositions of the present may also include, in addition to the humectant, a water miscible co-solvent or penetrant. Representative examples of co-solvents used in the aqueous-based compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide and tetramethylene sulfone. Typical aqueous-based surfactant compositions useful in the invention may contain 2-10 weight percent co-solvent(s).

Particular humectant and co-solvents useful in the present invention are 1,2-alkane diols (e.g. 1,2-hexane diol and 1,2-pentane diol) and lower alkyl glycol ethers (e.g. polyethyleneglycol monobutyl ether and diethyleneglycol monomethyl ether). These compounds are advantageous since surfactants formulated with the inventive polymeric dispersed surfactants can provide increased density and reduced mottle when printed onto plain papers. This is an advantage over surfactant dispersed surfactants or other polymeric dispersed surfactants known in the art since these systems can be destabilized by the high surface activity of the 1,2 alkane diols or alkyl glycol ethers.

Water Retention for Crops

In some embodiments, the invention includes a method of irrigating soil comprising combining one or more surface-treatment agent with an aqueous fluid to create a treated irrigation water. The additives comprise a preselected amount of a surface-treatment agent. The treated irrigation water is applied to a soil for an improved retention of water into the soil.

In some embodiments, the method includes producing an aqueous composition that comprises surface-treatment agents. The surface-treatment agent is added to the aqueous fluid in an amount sufficient for the improved retention of water in the soil during periods of drought.

In some embodiments, the invention includes a system for delivering a treated irrigation water to a soil using the method of irrigating soil described herein, wherein the system comprises a surface-treatment agent, wherein the composition comprises from about 1% to about 20% of a surface-treatment agent.

In some embodiments, the invention includes a method of improving the quality and shelf-life of an agricultural product, wherein the method comprises using the method of irrigating soil taught herein, the surface-treatment agent compositions taught herein, or the systems taught herein.

Dust Control

Add in situ agricultural use with ½ gal per 1000 sq ft. for crop use; (3) Military/desert use for dust/cooling over great areas; and (4) water retention system use over large areas.

The present invention relates to a dust-reducing composition for treating dry soil. This composition comprises a surface-treatment agent in relative amounts sufficient to form a water-retention surface on the soil.

The invention also relates to a process for treating dry soil to reduce dust generation due to movement of traffic or air thereover. This process comprises applying onto the soil a surface-treatment agent and subsequently applying a surfactant compound onto the surface-treatment agent containing soil.

The present invention specifically relates to a composition for avoiding the formation of clouds of dust on dry roads or paths made of earth or dirt or covered with small earth particles. The soil to be treated with the composition of the present invention is generally in a dry state, i.e., one that contains less that 5% water. Typically, the soil may be or include sand, clay, loess, loam or mixtures thereof.

The composition generally comprises a surface-treatment agent together with a surfactant compound in water. The solution enables the surface-treatment agent and surfactant compound to combine to render the surface water repellant.

In the composition according to the invention, the amount of surfactant compound is between 0.5 and 5% by weight based on the amount of the surface-treatment agent. The amount of the surface-treatment agent is preferably between 10 and 35% by weight of the final composition. The amount of water in the composition is generally between 50 and 90% by weight.

In a preferred embodiment of the process of the invention, the applied composition contains 2 to 10% by weight of the mixture of the active compounds. This composition is applied on the soil in the quantity of 0.05 to 4 liters per m2 of the soil.

Coating Methods

Various techniques may be used for applying a coating solution to an infill particle such as casting, spinning, spraying, dipping (immersing), ink jet printing, electrostatic techniques, and combinations of these processes. Choosing an application technique principally depends on the viscosity and surface tension of the solution. In embodiments of the present invention, dipping and spraying are preferred because it makes it easier to control the uniformity of the coating layer.

Description of the Turf Structure

FIG. 1 is an illustration of an exemplary embodiment of a synthetic turf system 10 of the present invention. As shown, the synthetic turf system comprises a backing layer 30.

The backing layer may be comprised of any known woven, non-woven, or spun-bonded fabric to which grass-like filaments 35 may be attached. Examples of conventional backing layers include woven warp type strands or slit film and cross or woof type strands or slit film to produce a woven sheet. It is preferred that the backing layer comprise of a stable, weather resistant material such as polyolefins, nylon, or similar material.

In one embodiment, the backing layer is supple and flexible such that it may conform to the foundation layer and potentially gives when impacted. The backing layer may also include one or more openings for movement of fluids such as, for example, water.

Grass-like filaments 35 are attached to the backing layer such that the grass-like filaments extend substantially upward, away from the foundation and backing layer. The grass-like filaments may be groups of filaments individually attached to the backing layer or thick individual filaments that are split at the top to give the appearance of numerous individual fibers.

The grass-like filaments may vary in thickness and size to give an appearance of natural grass. Typically, the grass-like filaments are comprised of one or more polyolefins, one or more nylons, or the like.

In one embodiment, a foundation may be used underneath the backing to support the system. The foundation may be bare ground, gravel, sand, rubber, construction materials, or a combination thereof with stone or other similar materials in order to provide support and adequate drainage for the synthetic turf system. Any known foundation, backing layer and grass-like filaments may be used in the various exemplary embodiments of the present invention.

The synthetic turf according to the various exemplary embodiments herein may further include a particulate infill comprised of one or more surface-modified sand, rubber granules, ceramic beads, soil and combinations thereof. Such particulate infill 50 may be positioned between and around the grass-like filaments 35.

In various exemplary embodiments of the present invention, when combining surface-modifying agents with sand, rubber granules, ceramic beads, soil or combinations thereof, the particulate infill is substantially homogeneous. That is, for example, in various embodiments the particulate infill not be divided into various layers of materials.

The particulate infill materials, in conjunction with the grass-like filaments attached to the backing layer, tend to mutually stabilize and hold one another in predetermined position.

Natural grass may be grown within and through the synthetic turf system. The natural grass may provide a more realistic appearance to the synthetic turf system. The synthetic turf system may further comprise nutrients for natural grass. In another embodiment, the synthetic turf system may further comprise controlled release nutrients.

The synthetic turf system may further comprise an underground sprinkler system for applying water to the treated infill as needed, one or more thermal probes for determining the temperature of the synthetic tuft systems, or a combination thereof. The one or more thermal probes may be a thermocouple system in substantial contact with the synthetic turf system and would allow remote monitoring of the installation.

The infill material may further be treated with one or more performance-enhancing additive such as antimicrobial agents, one or more anti-freezing agents, or a combination thereof.

As described herein, it is desirable to have a surface-modifying agent coating the infill particles of synthetic turf to provide a source of water for evaporative cooling of the turf surface during hot weather.

Infill particles include a core of granular material, which may be fabricated of a metallic material, a ceramic material, a stone material, a mineral material, a hard plastic material or any other hard material. In another embodiment, the core comprises a granular material. In one embodiment, the core is a particle of sand, and in another embodiment, quartz sand. In another embodiment, the core comprises a resilient particle. In another embodiment, the core comprises a polymer material. In another embodiment, the core comprises a rubber material. In another embodiment, the core comprises SBR crumb rubber. In one embodiment, the infill particles have a median size that is within a range of about 5 to about 60 mesh.

In another embodiment, the infill particles are fabricated so that the surface-modifying agent coating comprises about 0.02% to about 10% by weight of core of granular material. In another embodiment, the surface-modifying agent coating comprises about 0.04% to about 5.0% by weight of the core of granular material. In another embodiment, the coating comprises about 0.06% to about 3.0% by weight of the core of granular material.

In one embodiment, the coated infill particle is quartz sand and is preferably of an overall grain diameter in the range of about 0.0001 inches to about 0.2 inches, and in another embodiment, in the range of about 0.001 inches to about 0.1 inches, and most preferably in the range of about 0.015 inches to about 0.05 inches.

In some embodiments of the invention, a lightweight or heavyweight core material can be used to import differing performance characteristics. The core can be solid, hollow, absorbent, nonabsorbent, and combinations of these. In some embodiments of the invention, lightweight core materials include but are not limited to calcium bentonite clay, attapulgite clay, perlite, silica, non-absorbent silicious materials, sand, plant seeds, polymeric materials, ground rubber and mixtures thereof. In some embodiments of the invention, heavyweight cores may be used when it is desirable to have heavier particles. Heavy particles may be useful, for example, to add ballast to the field. Illustrative heavyweight core materials include but are not limited to sand, stone, metal, glass, clay, etc.

In one embodiment, performance-enhancing additive(s) are added to the material. In one embodiment, the performance-enhancing additive(s) are antimicrobials. In one embodiment, the antimicrobial actives are boron containing compounds such as borax pentahydrate, borax decahydrate, boric acid, polyborate, tetraboric acid, sodium metaborate, anhydrous, boron components of polymers, and mixtures thereof.

In one embodiment, the odor absorbing/inhibiting active inhibits the formation of odors. An illustrative material is a water-soluble metal salt such as silver, copper, zinc, iron, and aluminum salts and mixtures thereof. In another embodiment, the metallic salts are zinc chloride, zinc gluconate, zinc lactate, zinc maleate, zinc salicylate, zinc sulfate, zinc ricinoleate, copper chloride, copper gluconate, and mixtures thereof. In another embodiment, the odor control actives include nanoparticles that may be composed of many different materials such as carbon, metals, metal halides or oxides, or other materials. Additional types of odor absorbing/inhibiting actives include cyclodextrin, zeolites, silicas, activated carbon (also known as activated charcoal), acidic, salt-forming materials, and mixtures thereof. Activated alumina ($Al_2O_3$) has been found to provide odor control comparable and even superior to other odor control additives such as activated carbon, zeolites, and silica gel. Alumina is a white granular material, and is also called aluminum oxide.

In some aspects, additional additives may optionally be employed with the particulate compositions, including odor-binding substances, such as cyclodextrins, zeolites, inorganic or organic salts, and similar materials; anti-caking additives, flow modification agents, surfactants, viscosity modifiers, and the like. In addition, additives may be employed that perform several roles during modifications. For example, a single additive may be a surfactant, viscosity modifier, and may react to cross-link polymer chains.

In another embodiment, a color altering agent such as a dye, pigmented polymer, metallic paint, bleach, lightener, etc. may be added to vary the color of infill particles, such as to darken or lighten the color of all or parts of the composition so it is more appealing. In another embodiment, the color-altering agent comprises up to approximately 20% of the infill composition, more preferably, 0.001%-5% of the composition. In another embodiment, the color altering agent comprises approximately 0.001%-0.1% of the composition.

In another embodiment, the carriers for the color-altering agent are zeolites, carbon, charcoal, etc. These substrates can be dyed, painted, coated with powdered colorant, etc.

In another embodiment, the activated alumina and activated carbon may include an embedded coloring agent that has been added during the fabrication of the activated alumina or activated carbon to form a colored particle.

In composite and other particles, the activated alumina can also be added in an amount sufficient to lighten or otherwise alter the overall color of the particle or the overall color of the entire composition.

Coating of SBR Crumb Rubber

In another embodiment, the bulk of the infill consists of SBR crumb rubber sourced from passenger car and small truck tires. The rubber can be either ground under ambient or cryogenic conditions. The particle size of the rubber can vary between 6 and 50 mesh. A desirable particle size range is from 10 to 20 mesh.

In another embodiment, the amount of surface-modifying agent in the synthetic turf infill should be in a range that provides enough water to cool the turf for a minimum time period to encompass a full athletic event or practice time.

In another embodiment, the coating of the rubber particles with the reactive solution can be accomplished by any means that distributes the surface-treatment solution evenly over the rubber particle. In another embodiment, the formulated SBR used in tires can have a hydrophobic characteristic that causes the water to be isolated as droplets across the particle surface.

Coating of Sand Infill

Silica sand is used in the majority of $3^{rd}$ generation synthetic turf systems as a ballast to hold the turf in place and to adjust the firmness of the infill mixture to optimize the athletic performance of the turf system. In another embodiment, the sand as well as the rubber can be used as a carrier to introduce the surface-modifying agent into the turf system. As in the case of the rubber infill, the surface-modifying agent can be most advantageously introduced as a thin coating of surface-modifying agent on the sand particles.

The water solution is blended with the sand to wet out the surface of the sand. The water is allowed to evaporate and drive the cross-linking reaction.

Introduction of the Surface-Modifying Agent Coated Sand and/or Rubber into the Turf System The hydrated surface-modifying agent coated infill particle and pore and interstitial spaces releases water when the turf system is heated by sunlight. Higher levels of infrared heat in the sunlight releases more water, which in turn provides more cooling to the turf surface. To provide cooling, the surface-modifying agent coated infill particle must be wetted and must be located in the system where the heat energy impinging on the turf surface from the sunlight can be effectively transmitted to the wetted surface-modifying agent coated infill particle. A surface-modifying agent coated infill particle that is insulated from the sunlight will likely be ineffective at providing cooling to the surface.

The surface-modifying agent coated rubber or sand can be introduced to the field in the same manner that is used to introduce normal rubber and sand to the infill. The coated infill can be added using a broadcast spreader followed by brushing of the turf to distribute the infill within the synthetic turf grass blades. The sand and rubber can be pre-mixed, mixed in situ by adding the rubber and sand in layers and brushing the turf to mix the layers together. Alternatively, the sand and rubber can be introduced as discrete layers with the sand on bottom and rubber on top.

Spraying of Surface-Modifying Agent Solution

The pre-coating of surface-modifying agent coated infill particles requires the manufacturing steps of coating and drying the infill prior to shipping to the field for installation. The coated materials must also be protected from rainfall during shipping and storage onsite before being installed in the field. In one embodiment, it is advantageous to avoid the pre-coating step by introducing the surface-modifying agent coated rubber and/or surface-modifying agent coated sand by applying the surface-modifying agent as a solution to the infill while the infill is being installed. In one embodiment, a bottom layer of the infill can be installed without any surface-modifying agent allowing the surface-modifying agent to be added to the upper layer of infill as the infill is installed.

The surface-modifying agent solution can be introduced as a spray above the turf surface or it can be introduced below the surface of the infill. Introducing the solution under the surface has the advantage of not introducing surface-modifying agent solution to the grass fibers that are exposed above the turf surface. Introducing the surface-modifying agent solution as a spray above the turf has the advantage of introducing the surface-modifying agent with an even distribution across the surface of the turf.

The surface-modifying agent coated infill particles can be introduced in from one to 10 layers. The more layers allow the surface-modifying agent coated infill particles to be introduced more evenly. When the field is brushed to evenly distribute the infill, the surface-modifying agent coated infill particle distribution evenness is also increased.

In another embodiment of the invention, fields installed with standard particulates as described above (particularly rubber or rubber/sand mixtures) can be converted to surface-modifying agent coated infill particle cooled fields by introducing surface-modifying agent solution into the installed infill. In another embodiment of the invention, fields installed with surface-modifying agent coated infill particles, which have lost effectiveness for cooling can also be reactivated by introducing additional surface-modifying agent solution. The surface-modifying agent solution can be introduced by spraying or by injecting the surface-modifying agent solution into the top layer of the infill. The surface-modifying agent solution can be introduced into fields during a grooming procedure to distribute the surface-modifying agent within the infill or the top layer of infill can be removed and reintroduced in layers with the surface-modifying agent solution added between layers of infill. The surface-modifying agent solution can also be introduced substantially concurrent with installation of the infill by spraying the infill particles with the surface-modifying agent solution as it is being installed as an infill layer.

In one embodiment, the invention comprises fabricating a recreational surface using a mixture comprising resilient and inelastic particles and particles of a rubber coated granular material. In one embodiment, the mixture includes a relative proportion of the resilient particles with respect to the inelastic particles in order to adjust the parameters of the surface.

In an alternative embodiment of the, the synthetic turf system may further comprise infill 50, which may be comprised of one or more layers. When more than one layer comprises the infill, each layer of the infill may be of different compositions than other layers.

In one embodiment, at least one of the layers is comprised of a layer of shock absorbing material. In one embodiment, the layer of shock absorbing material is comprised of synthetic rubber.

In one embodiment, the layer of shock absorbing material has a thickness that is substantially within the range of about 10 mm to about 60 mm and more preferably within a range of about 15 mm to about 40 mm.

In another embodiment, the turf system further comprises a shock pad system. In one embodiment, the synthetic turf system further comprises a shock pad or E-layer. In one embodiment, the shock pad is applied below the backing layer. There are two general forms of shock pads used in synthetic turf systems. One is an in situ system that is fabricated on site as the turf is installed. The other type is prefabricated and brought to the field to be installed with the turf.

In one embodiment, a shock pad or E-layer may be applied to increase the value of shock absorption and vertical deformation. In one embodiment, the amount of infill material can be decreased.

In one embodiment, after the manufacturing of the synthetic turf fabric, a shock pad may be glued to or loosely laid upon a resilient pad. In one embodiment, the resilient pad is an elastomeric pad, for example, E-Layer Shock pad. In one embodiment, the pad is from about 1 mm to about 50 mm thick. In another embodiment, the pad is from about 10 mm to about 40 mm thick. In another embodiment, the pad is from about 15 mm to about 35 mm thick. The resilience from the pad provides safer shock absorption levels.

In one embodiment, surface coverings for sporting use are constructed by stitching into a preformed fabric backing layer to form tufts, and then bonding the primary backing layer to an impact-absorbing resilient lower layer or shock pad.

In one embodiment, the layers are chemically as well as physically joined together to form an integrated shock pad capable of multidirectional movement, similar to natural turf.

In one embodiment, the in situ pads are also called elastic layers (e-layers). They are a combination of SBR crumb rubber and a polyurethane binder. The two components are mixed to form a consistency similar to asphalt. The material is installed using a paving machine. The material under the e-layer may be asphalt, concrete, or compacted stone.

In another embodiment, the pad comprises one or more types of closed cell or open cell foams. In one embodiment, these are prepared as rolls or sheets that are connected to each other on the field base prior to the turf being installed. In one embodiment, the pads can be from 5 to 50 mm thickness depending on the density and material from which the pads are made. In another embodiment, the pads can be from 10 to 40 mm thickness. In another embodiment, the pads can be from 15 to 35 mm thickness.

In one embodiment, the infill 50 includes both resilient particles and particles of inelastic granular material. A resilient particle is defined as a particle that is fabricated from a material or materials that are substantially compressible at pressures that will be applied thereto when a person is walking or running on an artificial turf installation. A resilient particle in the preferred embodiment of the invention is embodied as a rubber particle but could alternatively be fabricated from another resilient material such as cork or vermiculate.

The material from which the rubber particles and/or the particles of water-adsorbing material coated granular material is fabricated may be impregnated with a substance that inhibits the growth of bacteria and/or mold. Alternatively, a coating of such a substance may be applied to the external surface of the rubber particle and/or to the external surface of the particles 100 of water-adsorbing material coated granular material.

In a recreational surface according to a second embodiment of the invention, a pile fabric as described above with reference to the first embodiment is installed. An infill 50 is then installed in separate and distinct layers. In another embodiment, this is performed by first installing a first (bottom) infill layer 60 that comprises granular material, rubber particles or a mixture thereof.

Figure 2:
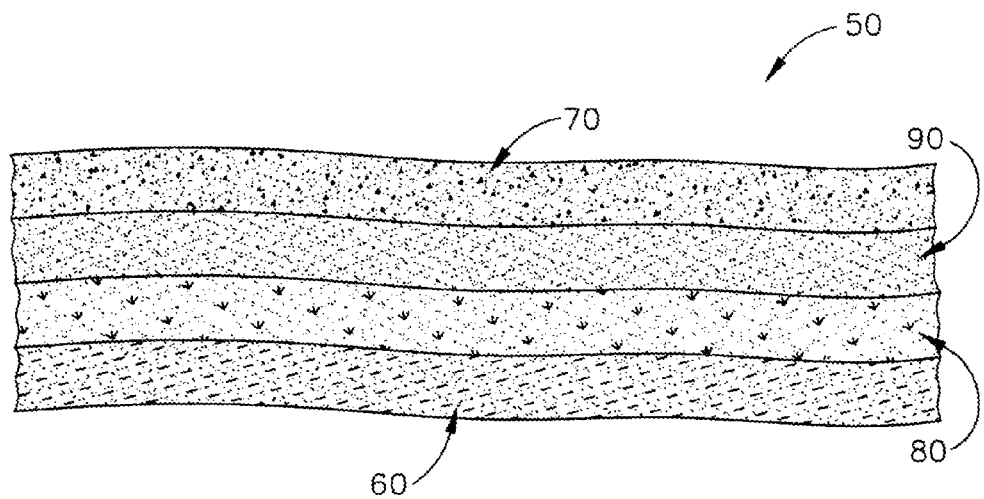
FIG. 2 is an illustrated representation of a multilayered infill according to one embodiment of the present invention.

After installation of the first (bottom) infill layer 60, a second (top) infill layer 70 is installed directly on top of the first (bottom) infill layer 60, as seen in FIG. 2. The second infill layer 70 comprises a granular material, rubber particles or a mixture thereof wherein at least a portion of the infill particles is coated with surface-modifying agent. In one embodiment, the coated infill particles of the second (top) infill layer 70 comprise at least 10%, 20%, 30%, 40%, 50%, 60%, 70%, 80%, 90%, or 100% of the total infill particle mix.

In another embodiment, one or more third (middle) infill layers 80 are installed directly on top of the first (bottom) infill layer 60 but before addition of the second (top) infill layer 70, which is then installed directly on top of the one or more third (middle) infill layers 80. The infill may further comprise one or more additional layers 90 as dictated by performance requirements.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

Example 1

Infill Surface Temperature Test

The infill technology is tested for evaporative cooling capacity and duration of cooling. The infill is based on modifying the surface of the rubber infill particles in order to lower the contact angle of water that comes in contact with the surface of the standard crumb rubber that is used in the synthetic turf system as infill.

Materials. Infill materials are chosen from standard synthetic turf industry infill materials of crumb rubber derived from recycled tires. Sample pans consist of metal pans with holes drilled in the bottom at the same on center spacing as the holes in standard synthetic turf backing A heat source is constructed from a 350 Watt IR lamp system suspended 28" above surface of samples. Thermocouple/Data loggers model TW-USB-2/2-LCD/2+/2-LCD+ (Thermoworks) and Thermocouple Probes are placed just under the surface of the infill samples.

Method: Control sample consists of crumb rubber infill filling sample pan to a depth of 1.75". Surface of infill is leveled. The substantially same amount is placed in the control pan, weighed and put in a 24"×24" processing pan and spread out evenly. Processing pan has no drain holes.

Coating recipe: H2015IS80T5 surface modifying solution is poured over surface of infill then stirred/mixed for 15 minutes until infill is completely "wetted out". Processing pan and infill are placed under IR drying lamp for three hours to assure complete curing. The H2015IS80T5 surface modifying solution comprises 15% distilled water, 80% isopropyl alcohol and 5% triethanolamine.

Infill is placed in the sample pan with drainage holes and leveled. The sample is weighed to determine cured solution add on level. One gallon of water is poured over each sample and excess water allowed to drain. After 15 minutes, this step is repeated. Thermocouples and heat source are turned on. Test is run for approximately 24 hours then the heat source is turned off and thermocouples removed. Thermocouple data is downloaded to a computer and the results recorded in a spreadsheet and graph.

The data collected indicates that the control samples heat up quickly and leveled off at a surface temperature typical of dry rubber infill. The infill samples maintain a lower temperature for a prolonged period indicating that evaporative cooling is effective, further indicating that the infill has "held" more water in its pore spaces and on its surface sustain evaporative cooling for an extended period.

The infill that has been coated with a surface modifying solution, changes from a material with a hydrophobic characteristic to a material that has a hydrophilic characteristic. This surface modification facilitates the storage of water within the infill matrix pore space enabling long term evaporative cooling. This is accomplished by changing the contact angle of water coming in contact with the rubber particles.

The invention claimed is:

1. A synthetic turf system, the artificial turf comprising a backing layer with a plurality of grass-like filaments attached and a synthetic turf infill cooling granule comprising a core particle coated with one or more surface-treatment agent; wherein the core particle comprises a granular material; and wherein the surface-treatment agent is an agent selected from the group comprising surfactants, detergents, and emulsifiers and wherein the surface-treatment agent (a) modifies the surface tension of the infill materials; and (b) alters a property of the materials selected from the group consisting of surface charge, surface charge density, surface hydrophobicity, and surface charge and hydrophobicity combined.

2. The synthetic turf system of claim 1, wherein the granular material is selected from the group consisting of gravel, sand, asphalt, cement, ceramic beads, perlite, silica, rubber or combinations thereof.

3. The synthetic turf system of claim 2, wherein the surface-treatment agent is a surfactant.

4. The synthetic turf system of claim 3, wherein the surface-treatment agent is a surfactant selected from the group consisting of an ionic polymeric surfactant, nonionic polymeric surfactant, polymeric surfactant, anionic polymeric surfactant, or zwitterionic polymeric surfactant.

5. The synthetic turf system of claim 4, wherein the surface treatment agent is a surfactant compound having an HLB value in the range of 4-20.

6. The synthetic turf system of claim 5, wherein the agent composition comprises from about 0.01 to about 5% (w/w) of a surfactant in combination with one or more solvents.

7. The synthetic turf system of claim 4, wherein the surface-treatment agent further comprises at least one non-surfactant.

8. The synthetic turf system of claim 7, wherein the surface-treatment agent used in the present invention does not increase the absorption of the infill materials but eliminates the hydrophobic aspect of the infill particles surface, which enables the interstitial pore spaces to hold and move moisture through surface tension and capillary forces.

9. The synthetic turf system of claim 8, wherein the surface-treatment agent is a surfactant that modifies the surface of the infill to become substantially hydrophilic with low contact angles.

10. The synthetic turf system of claim 5, wherein the surface-treatment agent further comprises an agent selected from the group consisting of a dispersant, a humectant, a solvent, a co-solvent, a penetrant and combinations thereof.

11. The synthetic turf system of claim 4, wherein at least one surface-treatment agent is a hydrophobic surfactant compound having an HLB value in the range of 5-15.

12. The synthetic turf system of claim 4, wherein at least one surface-treatment agent is a surfactant selected from the group consisting of polyethylene glycol (PEG)-fatty acid mono-esters and diesters.

13. The synthetic turf system of claim 4, wherein at least one surface-treatment agent is a polyethylene glycol fatty acid monoester or diester selected from the group consisting of esters of lauric acid, oleic acid, stearic acid, myristoleic acid, palmitoleic acid, linoleic acid, linolenic acid, eicosapentaenoic acid, erucic acid, ricinoleic acid, and docosahexaenoic acid.

14. The synthetic turf system of claim 13, wherein at least one surface-treatment agent is a hydrophobic surfactant compound having an HLB value less than about 10.

15. The synthetic turf system of claim 4, wherein the surface-treatment agent further comprises a performance-enhancing additive.

16. The synthetic turf system of claim 15, wherein the performance-enhancing additive is selected from the group consisting of an antimicrobial, an odor reducing material, a binder, a fragrance, a color altering agent, a dust reducing agent, a nonstick release agent, a cyclodextrin, zeolite, activated carbon, a pH altering agent, a salt forming material, a ricinoleate, silica gel, UV stabilizers or protectants, crystalline silica, activated alumina, an anti-clumping agent, and mixtures thereof.

* * * * *